(12) United States Patent
Pike et al.

(10) Patent No.: US 7,971,897 B2
(45) Date of Patent: Jul. 5, 2011

(54) FOLDABLE STROLLER HAVING DISCRETE HANDLEBAR

(75) Inventors: Robert T. Pike, Reading, PA (US); Michael A. Dotsey, Pottstown, PA (US); Roy L. Dean, Pottstown, PA (US); Andrew Serbinski, Annandale, NJ (US)

(73) Assignee: Graco Children's Products, Inc., Atlanta, GA (US)

( * ) Notice: Subject to any disclaimer, the term of this patent is extended or adjusted under 35 U.S.C. 154(b) by 416 days.

(21) Appl. No.: 12/160,684

(22) PCT Filed: Mar. 20, 2007

(86) PCT No.: PCT/US2007/064456
§ 371 (c)(1),
(2), (4) Date: Jul. 11, 2008

(87) PCT Pub. No.: WO2007/109696
PCT Pub. Date: Sep. 27, 2007

(65) Prior Publication Data
US 2009/0152836 A1 Jun. 18, 2009

Related U.S. Application Data

(60) Provisional application No. 60/784,103, filed on Mar. 20, 2006.

(51) Int. Cl.
*B62B 3/00* (2006.01)
*B62B 1/00* (2006.01)
(52) U.S. Cl. ........ 280/650; 280/642; 280/647; 280/658; 280/47.38

(58) Field of Classification Search .................. 280/642, 280/647, 650, 652, 658, 655, 47.371, 47.38
See application file for complete search history.

(56) References Cited

U.S. PATENT DOCUMENTS

| | | | |
|---|---|---|---|
| 3,936,069 A * | 2/1976 | Giordani | ........................ 280/650 |
| 184,867 A | 11/1976 | Hazelip | |
| 4,635,926 A | 1/1987 | Minkow | |
| 5,205,185 A | 4/1993 | Herman | |
| 5,224,396 A | 7/1993 | Lobbezoo et al. | |
| 5,460,398 A * | 10/1995 | Huang | ........................ 280/642 |

(Continued)

FOREIGN PATENT DOCUMENTS

EP 1 170 193 1/2002

(Continued)

OTHER PUBLICATIONS

International Search Report and Written Opinion issued in corresponding International Application No. PCT/US2007/064456 mailed Feb. 18, 2010.

*Primary Examiner* — Hau V Phan
(74) *Attorney, Agent, or Firm* — Lempia Summerfield Katz LLC

(57) ABSTRACT

A stroller is provided having a stroller frame supported by front and rear wheels. The frame includes a latch assembly that is movable between a locked and an unlocked position. When in the locked position, the latch assembly prevents the frame from being folded. When in the unlocked position, the latch assembly allows the frame to be folded. The frame is connected to an ergonomically friendly handlebar having discrete outer ends. The handlebar includes a latch release handle that is operably connected to the latch assembly.

18 Claims, 20 Drawing Sheets

U.S. PATENT DOCUMENTS

| | | |
|---|---|---|
| 5,562,300 A | 10/1996 | Nelson |
| 5,645,293 A * | 7/1997 | Cheng ........................... 280/642 |
| 5,769,447 A * | 6/1998 | Huang ........................... 280/642 |
| 5,921,139 A | 7/1999 | Yamane |
| 6,053,525 A * | 4/2000 | Lin ................................ 280/642 |
| 6,068,284 A * | 5/2000 | Kakuda ......................... 280/642 |
| 6,073,957 A * | 6/2000 | Lan ............................... 280/642 |
| 6,312,005 B1 * | 11/2001 | Lin ................................ 280/647 |
| D474,426 S | 5/2003 | Hartenstein et al. |
| 6,572,134 B2 * | 6/2003 | Barrett et al. ................. 280/650 |
| 6,722,690 B2 * | 4/2004 | Lan ............................... 280/642 |
| 6,921,102 B2 | 7/2005 | Hsia |
| 7,188,858 B2 * | 3/2007 | Hartenstine et al. .......... 280/642 |
| 7,377,527 B2 | 5/2008 | Cunningham |
| 7,410,186 B2 | 8/2008 | Hartenstein et al. |
| 7,694,980 B2 * | 4/2010 | Dotsey et al. ............ 280/47.371 |
| 7,694,995 B2 * | 4/2010 | Dotsey et al. ................. 280/642 |
| 7,780,183 B2 * | 8/2010 | Chen et al. .................... 280/647 |
| 2003/0132614 A1 | 7/2003 | Kreamer |
| 2003/0201626 A1 | 10/2003 | Hartenstein et al. |
| 2004/0183275 A1 | 9/2004 | Chen |
| 2004/0194361 A1 | 10/2004 | Furlan et al. |
| 2004/0222607 A1 | 11/2004 | Myers |
| 2006/0145446 A1 | 7/2006 | Schmider |

FOREIGN PATENT DOCUMENTS

| | | |
|---|---|---|
| GB | 2 403 934 | 1/2005 |

\* cited by examiner

FOLDABLE STROLLER HAVING DISCRETE HANDLEBAR

RELATED APPLICATION DATA

This application claims the benefit of provisional application No. 60/784,103 filed Mar. 20, 2006, the disclosure of which is hereby incorporated by reference as if set forth in its entirety herein.

BACKGROUND

1. Field of the Disclosure

The present invention relates to strollers for children, in particular strollers that are easily folded to a stored, compact configuration.

2. Description of Related Art

Well-designed strollers should be sturdy and balanced. It should afford the child passenger safe and comfortable transport. The adult user should find the stroller easy to maneuver, easy to fold and unfold, and easy to handle when folded. It should have features that make it versatile and convenient. And it should be simple in design, rugged and reliable. Foldable strollers are known that address some of these criteria.

A conventional folding stroller has a plurality of wheels supporting an articulated frame that has two spaced front legs, two spaced rear legs, a pair of push arms, and a crossbar connected at its laterally outer ends to the push arms. The crossbar can be provided with a pair of laterally spaced gripping surfaces that can be engaged by a user when driving the stroller, and a handle assembly disposed between the gripping surfaces. The stroller further includes a pair of fold latches associated with the push arms that operate to lock the stroller frame in the erect (open) position and to unlock the stroller frame, thereby allowing the frame to fold to a closed position.

A cable or other motion transfer mechanism is disposed within the stroller frame, and is connected between the handle assembly and the fold latches. Accordingly, a user can actuate (typically rotate) the handle, which converts the rotational motion and applies a linear force to the cable to lock and release the fold latches, thereby permitting the stroller to fold and unfold.

Unfortunately, the crossbar fails to provide an ergonomically friendly gripping surface for the user. For instance, the crossbar forms part of the stroller frame, and therefore is not height adjustable. It is therefore desirable to provide an ergonomically friendly handle assembly that is attached to the stroller frame that allows the user to impart directional forces to the stroller while also providing a release handle that can be actuated by the user with one hand to facilitate folding of the stroller.

SUMMARY

A stroller is foldable between an open position and a folded position. The stroller includes a frame supported by front and rear wheels. The frame includes a latch assembly movable between a locked position and an unlocked position. When in the locked position, the latch assembly prevents the frame from being folded, and when in the unlocked position, the latch assembly allows the frame to be folded. A handlebar is attached to the frame. The handlebar has a latch release handle. A motion transfer mechanism is operably connected between the latch release handle and the latch assembly. Movement of the latch release handle causes the motion transfer mechanism to move the latch assembly to the unlocked position.

It should be appreciated that the foregoing and other aspects of the invention will appear from the following description. In the description, reference is made to the accompanying drawings which form a part thereof, and in which there is shown by way of illustration, and not limitation, preferred embodiments of the invention. Such embodiments do not necessarily represent the full scope of the invention, and reference must therefore be made to the claims herein for interpreting the full scope of the invention.

BRIEF DESCRIPTION OF THE DRAWINGS

Reference is made to the following drawings in which like reference numerals are intended to identify like elements throughout, and in which.

DETAILED DESCRIPTION

Figure 1A:
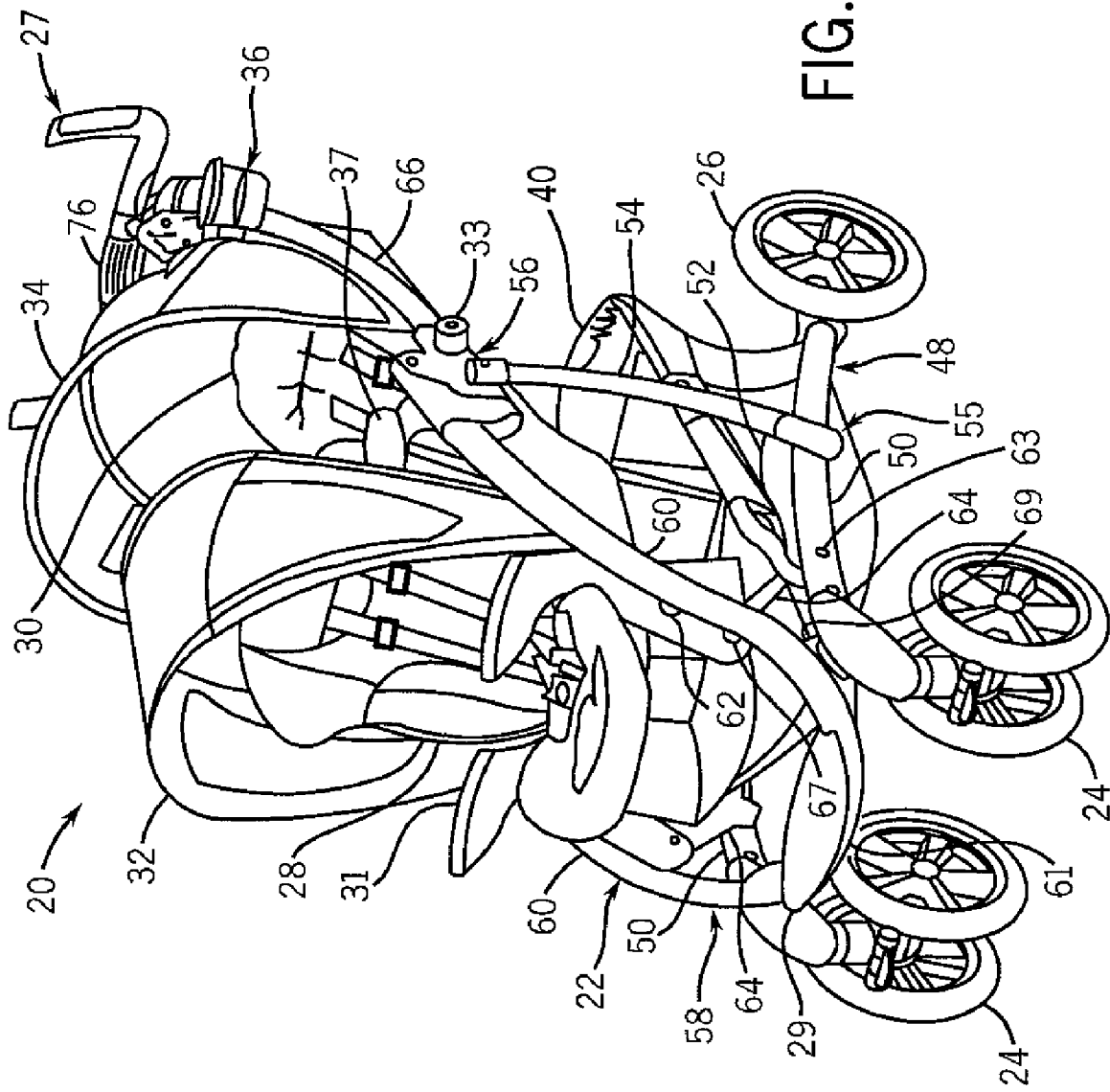
FIG. 1A is a perspective view of a double stroller constructed in accordance with certain aspects of the present invention, wherein the stroller is illustrated in a fully open (erect) configuration.
Figure 1B:
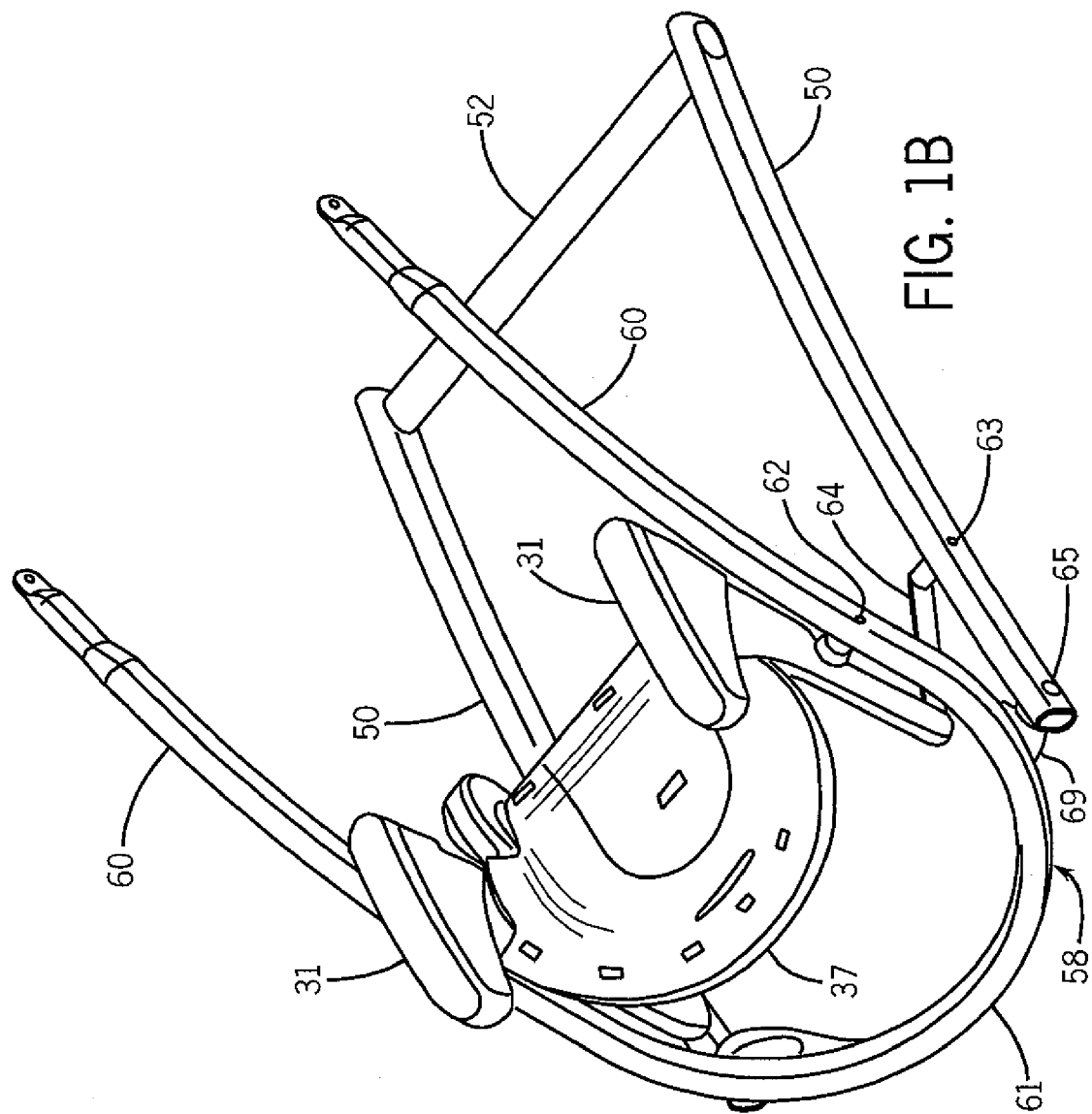
FIG. 1B is a perspective view of the forward portion of the frame of the stroller illustrated in FIG. 1.
Figure 1C:
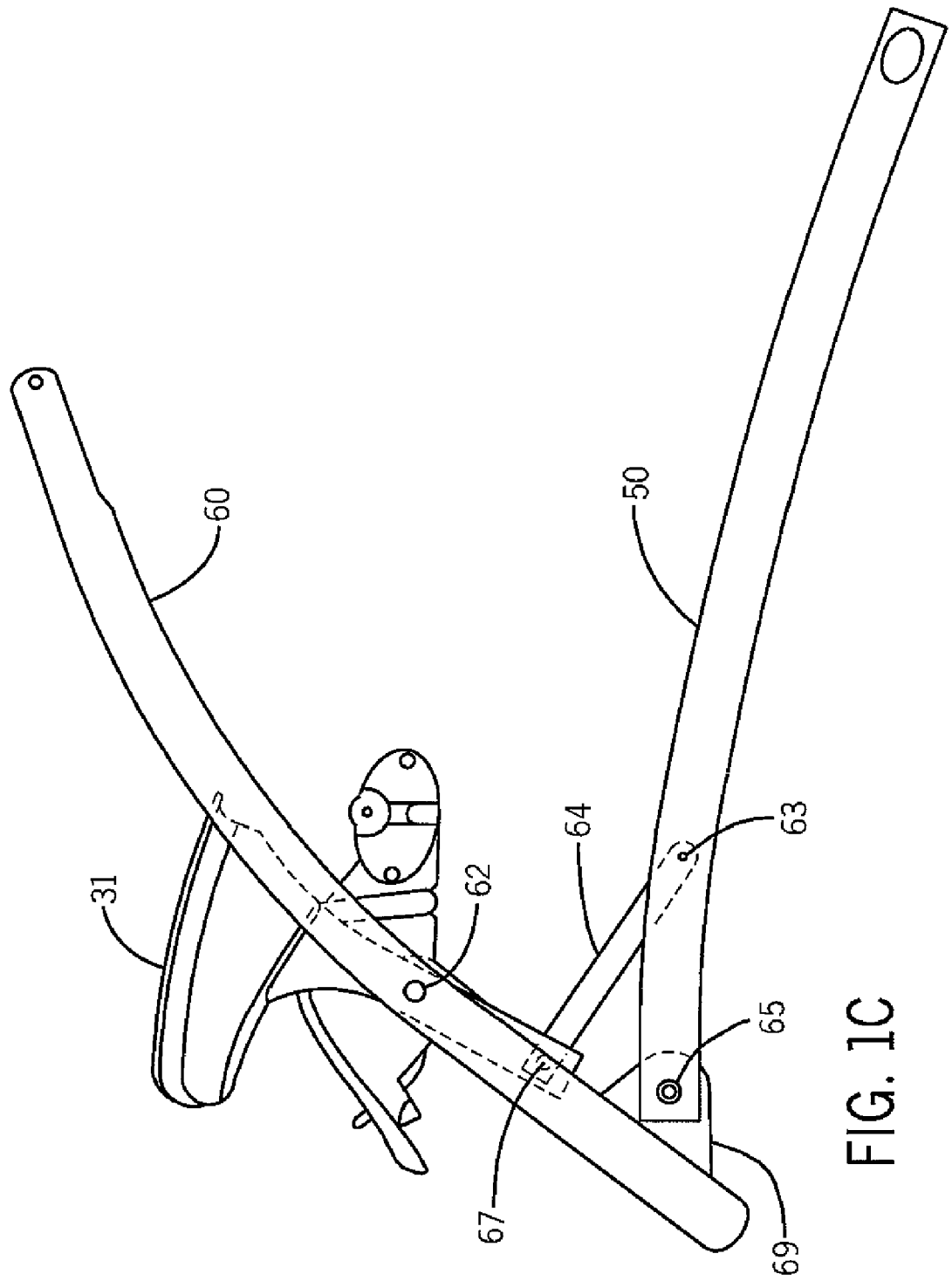
FIG. 1C is a side elevation view of the forward portion of the stroller frame illustrated in FIG. 1B.

Referring to FIGS. 1A-1C, an exemplary stroller 20 includes a foldable frame 22 supported for movement via at least one wheel. As illustrated, the foldable frame is supported by a pair of laterally spaced front wheels 24 and a pair of laterally spaced rear wheels 26. A handlebar 27 extends upward and rearward from the rear end of the frame 22. The frame components can be made from tubular aluminum, though steel or other suitable alternative materials having sufficient strength and rigidity could be used. The frame 22 supports an adjustable front child seat 28 and corresponding footrest 29 and armrest 31, and an adjustable rear child seat 30 and corresponding footrest and armrest (not shown). Each child seat 28 and 30 can be provided with a tray 37, and one or more child cup holders (not shown) that can be connected to each armrest 31 for the storage of beverages and the like.

The stroller 20 can further include one or more accessories. For instance, front and rear canopies 32 and 34 are provided in juxtaposition with the front and rear child seats 28 and 30, respectively. Additionally, a parent console 36 is provided adjacent the handlebar 27, and can include, for instance, any combination of a tray and one or more cup holders. A basket 40 can be provided below the rear child seat 30 for the storage and transportation of miscellaneous items as desired.

In the embodiment illustrated in FIG. 1A, the frame 22 is supported by a chassis 48 that includes a pair of longitudinally elongated legs 50 forming the base of the frame 22. A rear axle 50 extends laterally between the legs 50 and is rigidly connected to the rear ends of the legs 50. The axle 52 rotatably supports the wheels 26 in the usual manner. The front ends of the legs 50 rotatably support the front wheels 24, in the form of a duplex caster, in the usual manner.

A side support strut 54 is pivotally connected to each leg 50, and extends substantially vertically upward from the leg 50. Specifically, each strut 54 are spaced from the front and rear ends of the legs 50, and are connected to a middle portion of the legs 50. Each strut 54 can include a shock absorbing assembly 55 constructed in the usual manner. The upper ends of each strut 54 are pivotally connected to an outer surface of a corresponding foldable latch assembly 56. The latch assembly 56 further receives the rear terminal ends of a U-shaped support bar 58.

The support bar 58 includes a pair of laterally spaced side arms 60 that provide the front legs of the frame 22. The front legs 60 are connected at their forward ends to a U-shaped section 61, which supports the footrest 29. The side arms 60 extend laterally outboard of the canopy 32 and the armrests 31, and are pivotally connected to the outer surface of the armrests 31 substantially midway between the front and rear ends of the side arms 60 at pivot joint 62. Pivot joint 62 is further disposed substantially vertically midway up the armrest 31. A linkage 64 connects each corresponding leg 50 to the corresponding armrest 31. Specifically, an upper pivot joint 67 connects the upper end of the linkage 64 to the lower end of the corresponding armrest 31. Pivot joint 67 is thus disposed below (and slightly forward of) pivot 62. A lower pivot joint 63 connects the lower end of the linkage 64 to the leg 50 at a location that is spaced forward with respect to the strut 54. A pivot joint 65 pivotally connects the front end of each leg 50 to the support bar 58 via a flange 69 that extends down from the support bar 58.

The front legs 60 and base legs 50 can have cross-sections that are oblong or oval, for instance elliptical. Such sections have a stronger section modulus as compared to round tubing having the same cross-sectional area, thus enhancing vertical load strength and imparting a robust appearance onto the stroller 20. The front legs 60 and the base legs 50 can also be about the same length, so that they fold compactly onto each other. The base legs 50 can bow upwardly such that its convex side faces up, thus providing greater ground clearance between the front and the rear wheels than a straight leg. The front legs 60 can also be curved similar to the curvature of base legs 50, thereby allowing the front legs 60 to compactly nest with legs 50 when the stroller 20 is folded.

Figure 6A:
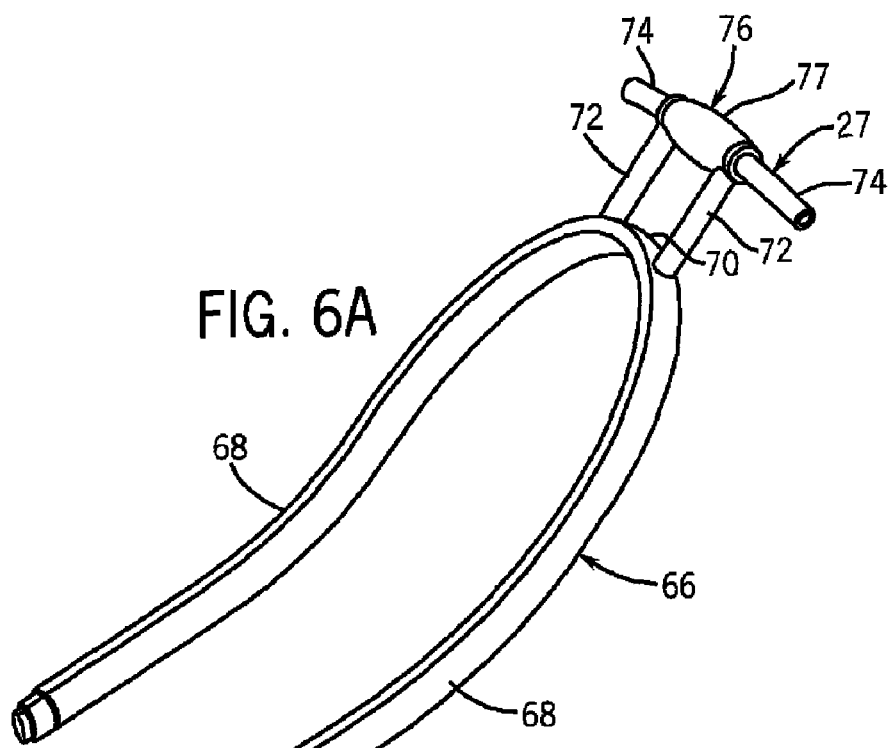
FIG. 6A is a perspective view of a portion of a stroller frame including a handle assembly constructed in accordance with one embodiment of the present invention.
Figure 6B:
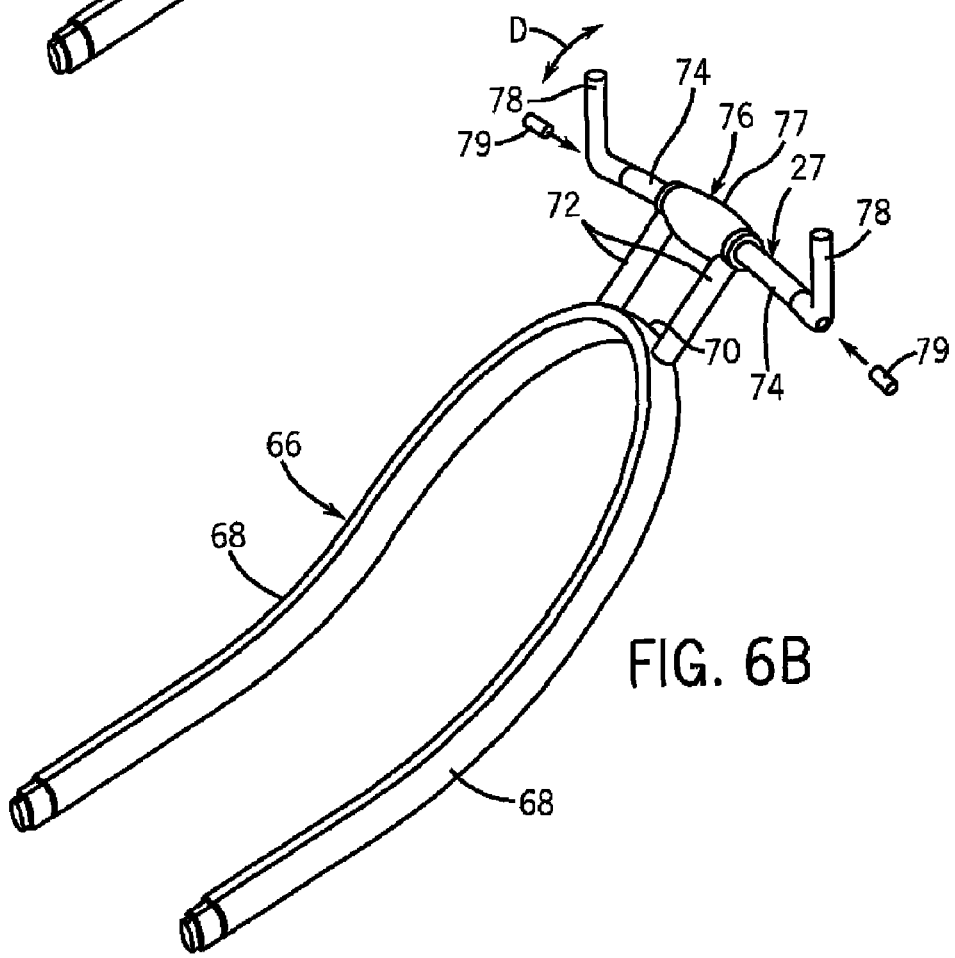
FIG. 6B is a perspective view of the portion of a stroller frame illustrated in FIG. 6A but including auxiliary handle gripping surfaces constructed in accordance with certain aspects of the present invention.

Referring also to FIGS. 6A and 6B, the stroller frame 22 includes a U-shaped push arm 66 including a pair of side arms 68 connected at their front ends to the latch assembly 56. The side arms extend rearward and upward from the latch assembly 56 when the stroller is erect, and are connected at their rear ends at a U-shaped section 70. A pair of laterally spaced stanchions 72 is connected to the U-shaped section 70, and extends rearward and upward from the U-shaped section 70. The handlebar 27 extends substantially laterally and is connected to the rear ends of the stanchions 72.

As illustrated in FIG. 6A, the handlebar 27 defines terminal ends at its laterally outer ends. It should be appreciated by one skilled in the art, however, that the present invention contemplates that the laterally outer ends of the handlebar 27 need not be separately terminal, but rather can be connected, for instance as a grip having a looped profile. A pair of grips 74 is located at both lateral ends of the handlebar 27 outboard of the stanchions 72. The handlebar includes a latch release handle 76 that also includes a grip 77 disposed between the stanchions 72. As illustrated in FIG. 6B, a pair of auxiliary grips 78 extends out from the lateral terminal ends of the handlebar 27. In one embodiment, the auxiliary grips 78 extend perpendicular from the handlebar 27, and in one aspect can extend vertically or at any desired angle with respect to the vertical. The auxiliary grips 78 can assume any suitable shape and form that provides an ergonomically friendly grip. For instance, they can be curved along one or more planes. In certain aspects of the invention, the grips 78 are pivotally connected to the laterally outer ends of the handlebar 27 such that the angular orientation of the grips 78 can be adjustable and locked in the desired position. The present invention therefore provides a discrete handlebar 27 having terminal outer ends. Advantageously, the handlebar 27 can be ergonomically designed as opposed to conventional handlebars, which are an integral part of the stroller frame 22. Furthermore, as will be described in more detail below, the present invention allows the discrete handlebar 27 to lock and unlock the latch assembly 56.

Figure 2A:
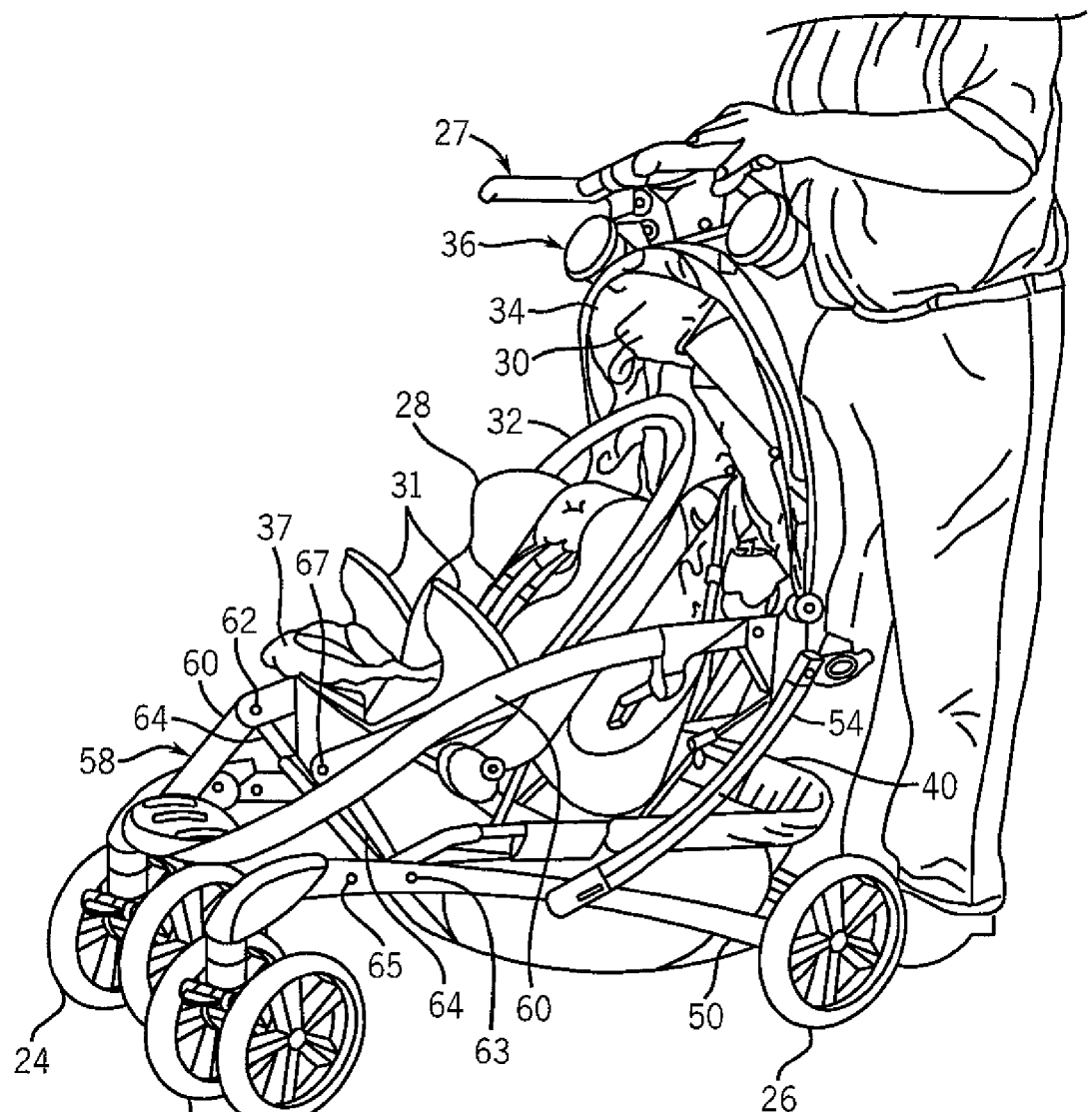
FIG. 2A is a perspective view of the stroller illustrated in FIG. 1A as the stroller is partially folded from the open towards a folded configuration.
Figure 2B:
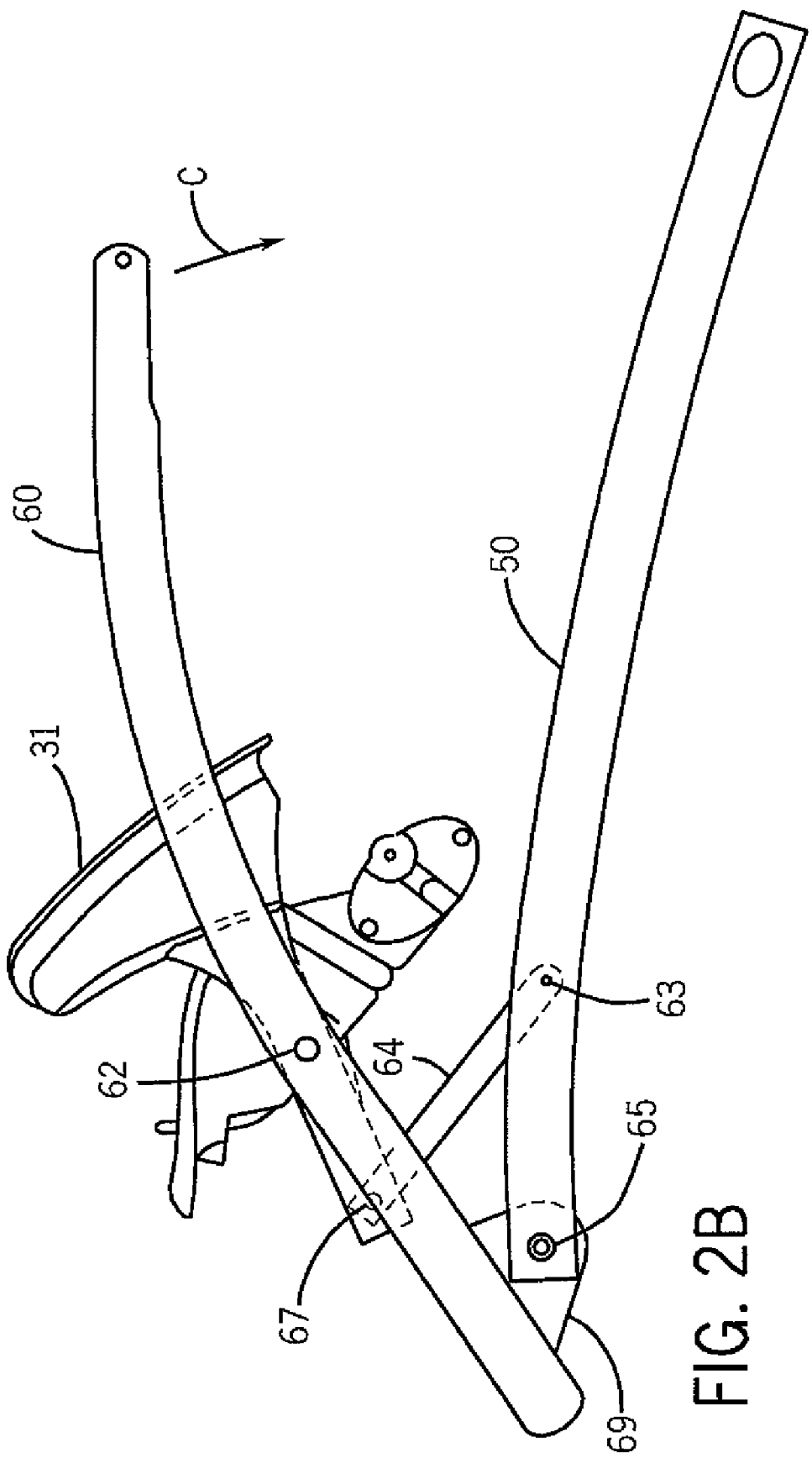
FIG. 2B is a side elevation view of a front portion of the stroller frame illustrated in FIG. 2A.
Figure 3A:
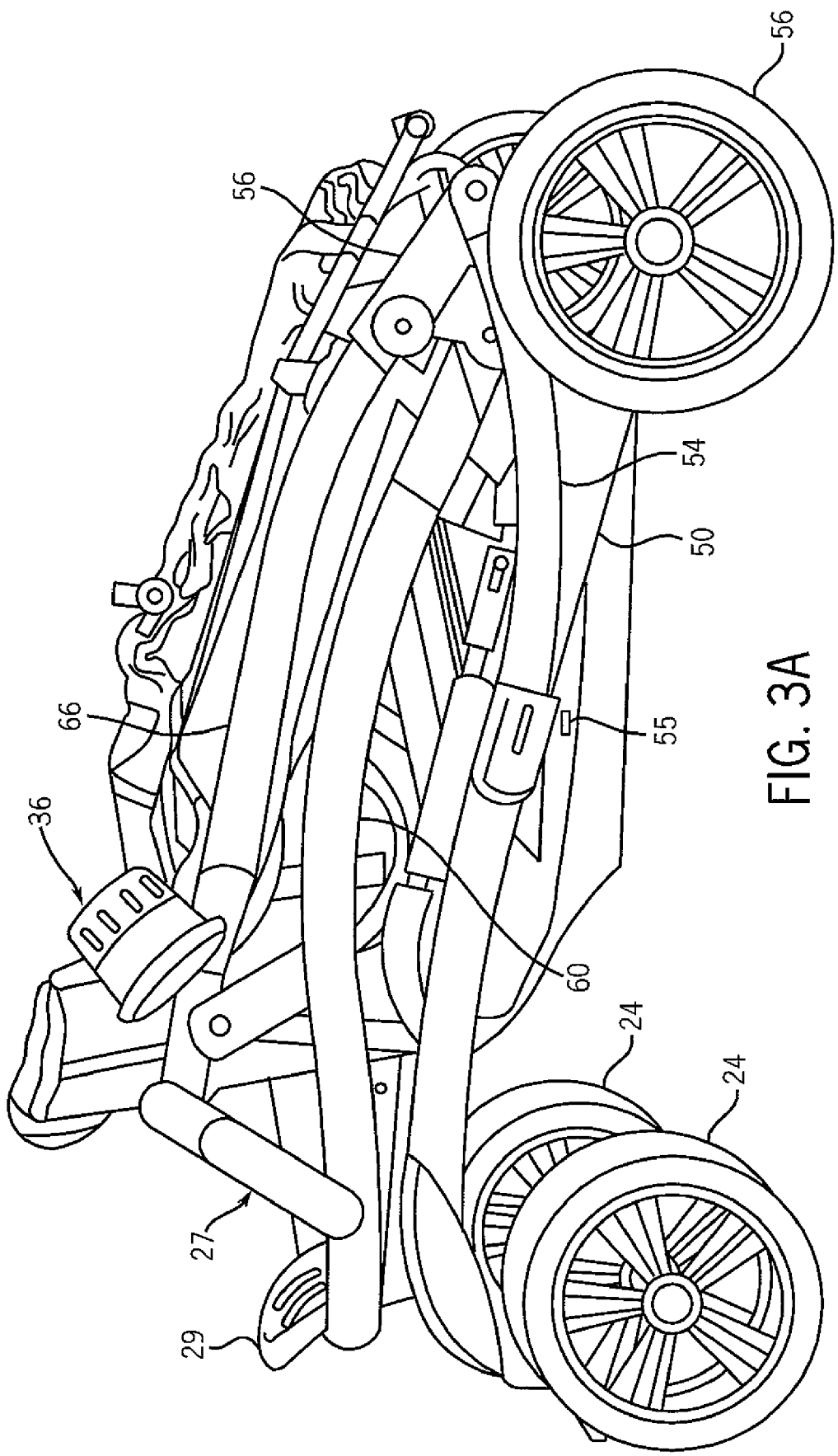
FIG. 3A is a perspective view of the stroller illustrated in FIG. 1A in the folded configuration.
Figure 3B:
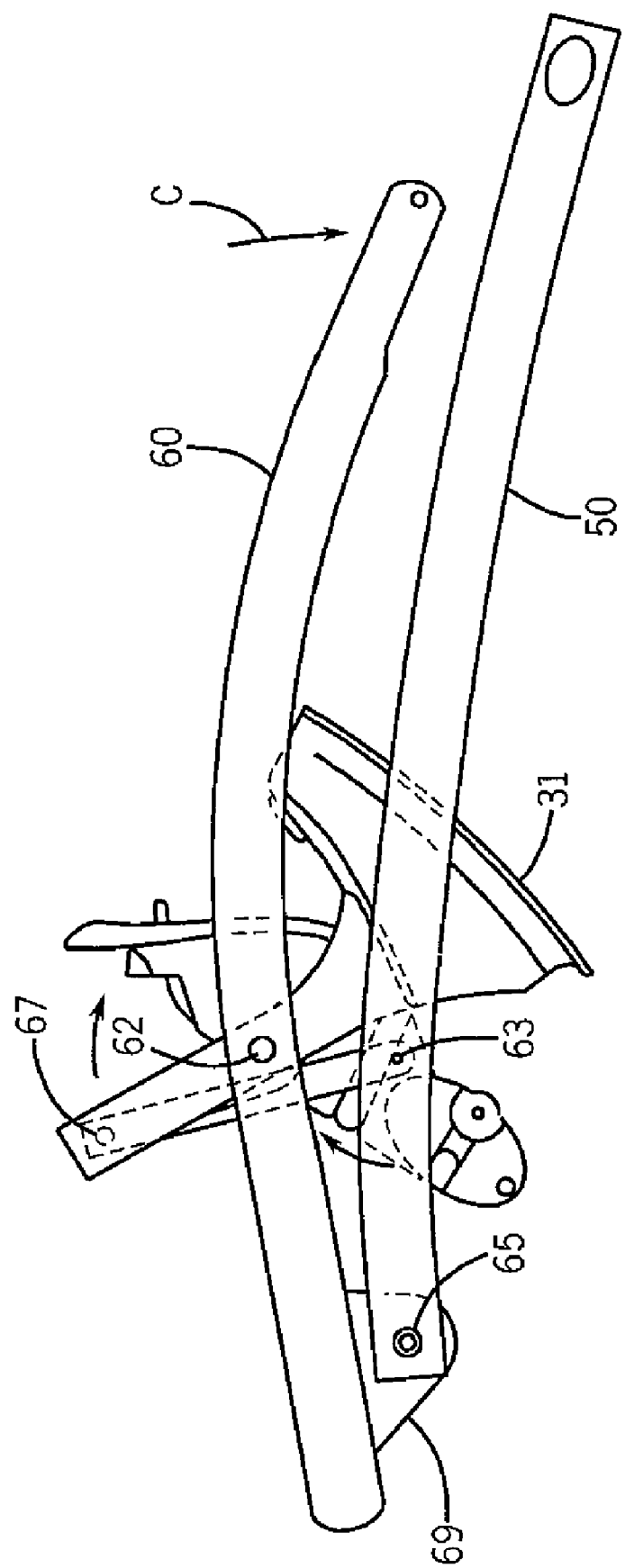
FIG. 3B is a side elevation view of a front portion of the stroller frame illustrated in FIG. 3A.

Referring now also to FIGS. 2A and 2B, the latch release handle 76 can be actuated by the user to unlock the latch assembly 56, thereby allowing the stroller 20 to be folded. Specifically, the user articulates the handlebar 27 forward, which causes the push arm 66 to pivot about the latch assembly 56. At the same time, the top of the support struts 54 are pivoted rearward, thereby causing the U-shaped support bar 58 to pivot rearward and downward about pivot 69 along the direction of Arrow C (FIG. 3B). As the support bar 58 collapses, the side arms 60 draw the armrests 31 and corresponding child seat 28 to a collapsed position as well. The linkage 64 pivots between pivot joints 67 and 63, and causes the armrests 31 and child seats 28 to pivot rearward about the pivot joint 62. The stroller frame 22 similarly causes child seat 30 to collapse. The stroller 22 is illustrated in its fully folded, or collapsed position, in FIGS. 3A and 3B. Folding is advantageously simple and easy because the entire stroller drops to the ground without the user having to control the weight of the stroller as it folds. Folding is accomplished with all four wheels on the ground and the rear legs 50 remaining at close to their initial shallow angle.

Figure 4:
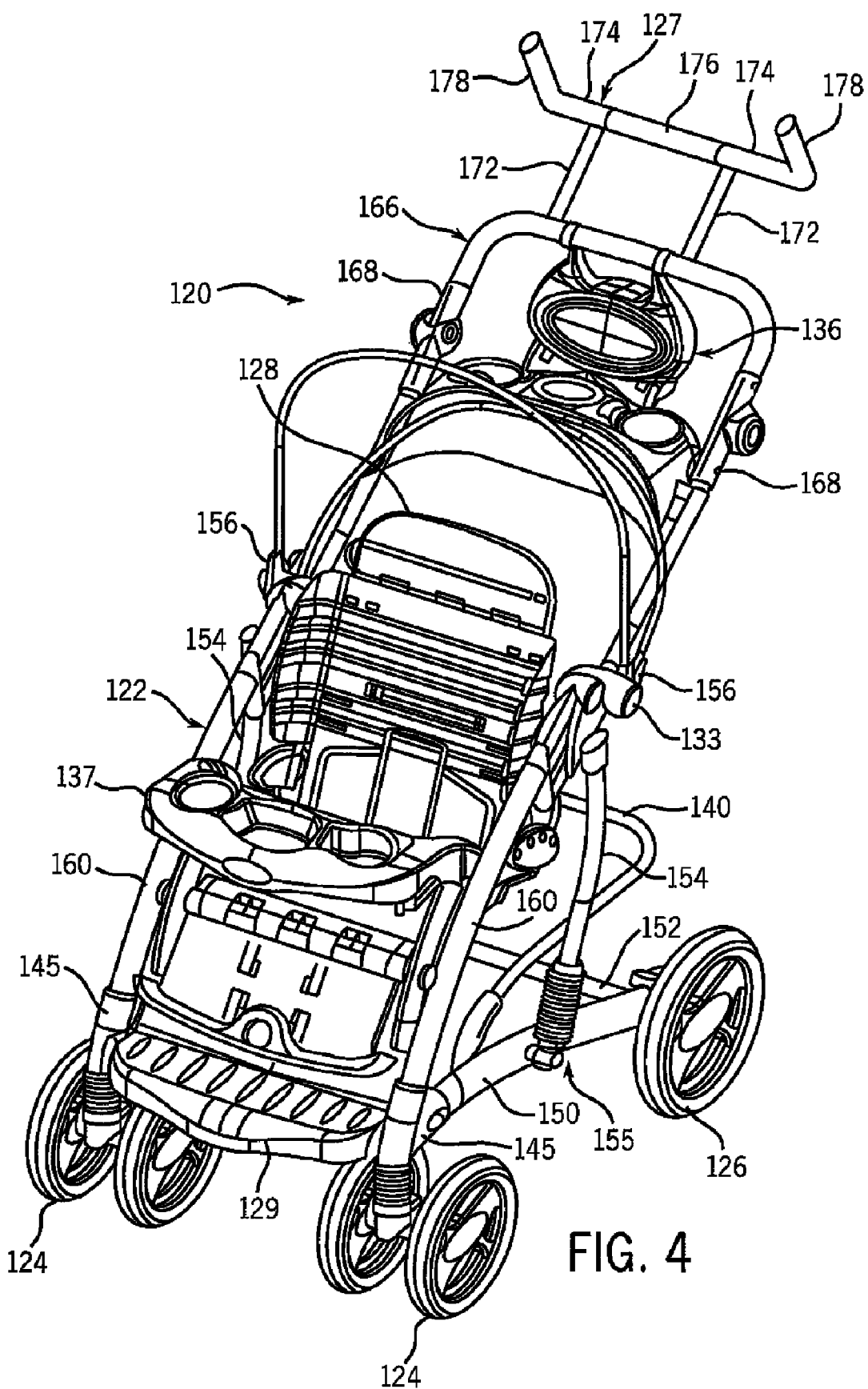
FIG. 4 is a perspective view of a stroller constructed in accordance with certain aspects of the present invention, wherein the stroller is illustrated in a fully open (erect) configuration.

While one exemplary stroller constructed in accordance with the principles of the present invention has been illustrated and described with respect to FIGS. 1-3, it should be appreciated that the present invention is not limited to the particular stroller, and that basically any suitable stroller could incorporate the advantages of the present invention. Referring now to FIG. 4, one such stroller 120 is illustrated as an example. In FIG. 4, reference numerals of the stroller 120 corresponding to like elements of the stroller 20 of FIGS. 1-3 have been incremented by 100 for the purposes of clarity and convenience. The stroller 120 is shown in FIG. 4 without the soft goods associated with the stroller (e.g., canopy, seat cushions, and basket).

Certain differences of the stroller 120 with respect to the stroller 20 will now be described with reference to FIG. 4. In particular, the side sections 160 are not connected in a U-shaped manner, but rather define discrete front legs supporting the wheels 124. A clevis-type hinge bracket 145 is riveted to the lower part of each front leg 160 to provide hinge points 165 for the elongated legs 150 forming the base of the frame 122. With the exception of the stanchions 72 and handlebar 74, the construction and operation of the stroller 120 is further described in U.S. patent application Ser. No. 10,397,197 filed Mar. 27, 2003, the disclosure of which is hereby incorporated by reference as if set forth in its entirety herein.

Figure 5A:
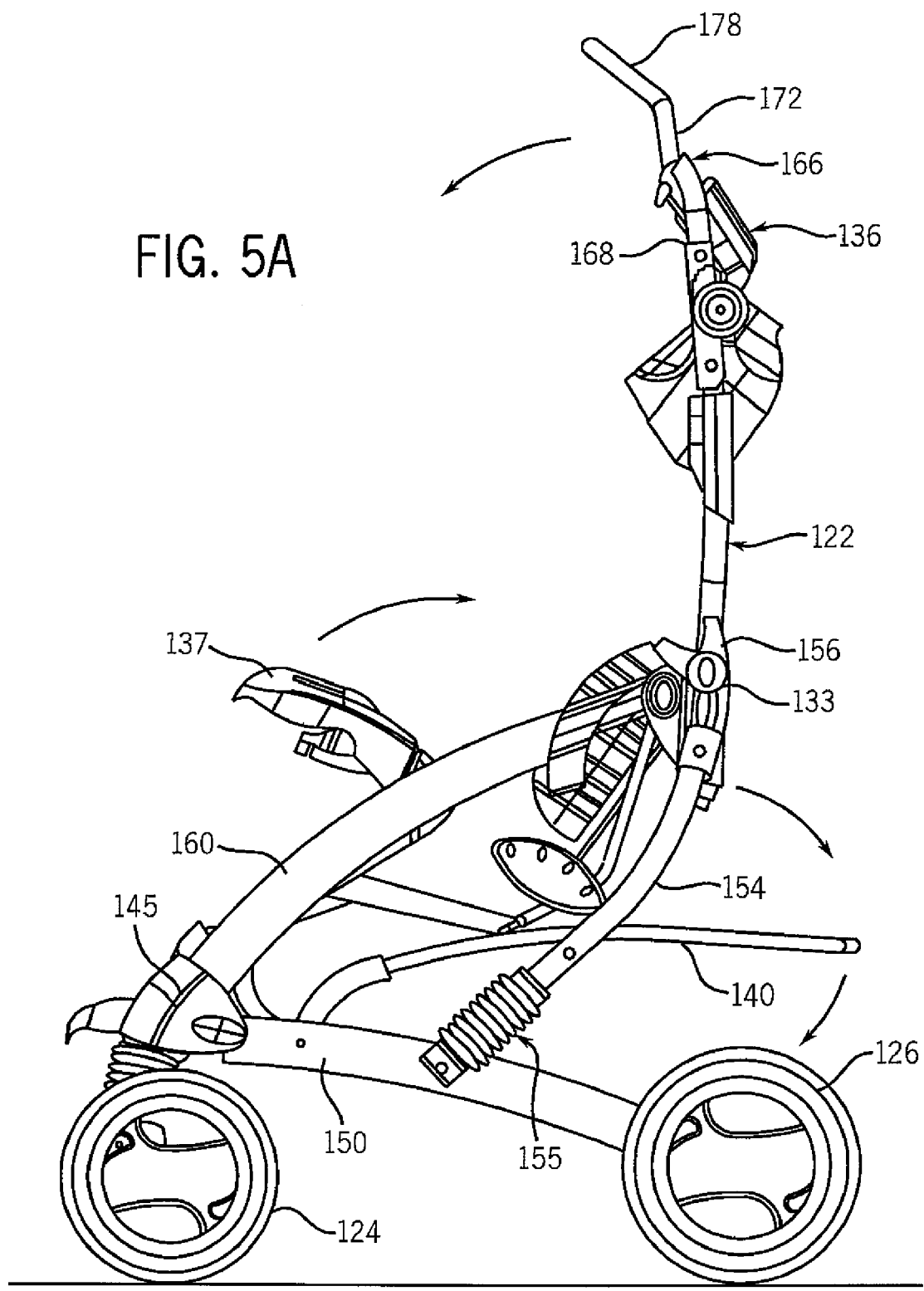
FIG. 5A is a side elevation view of the stroller illustrated in FIG. 4.
Figure 5B:
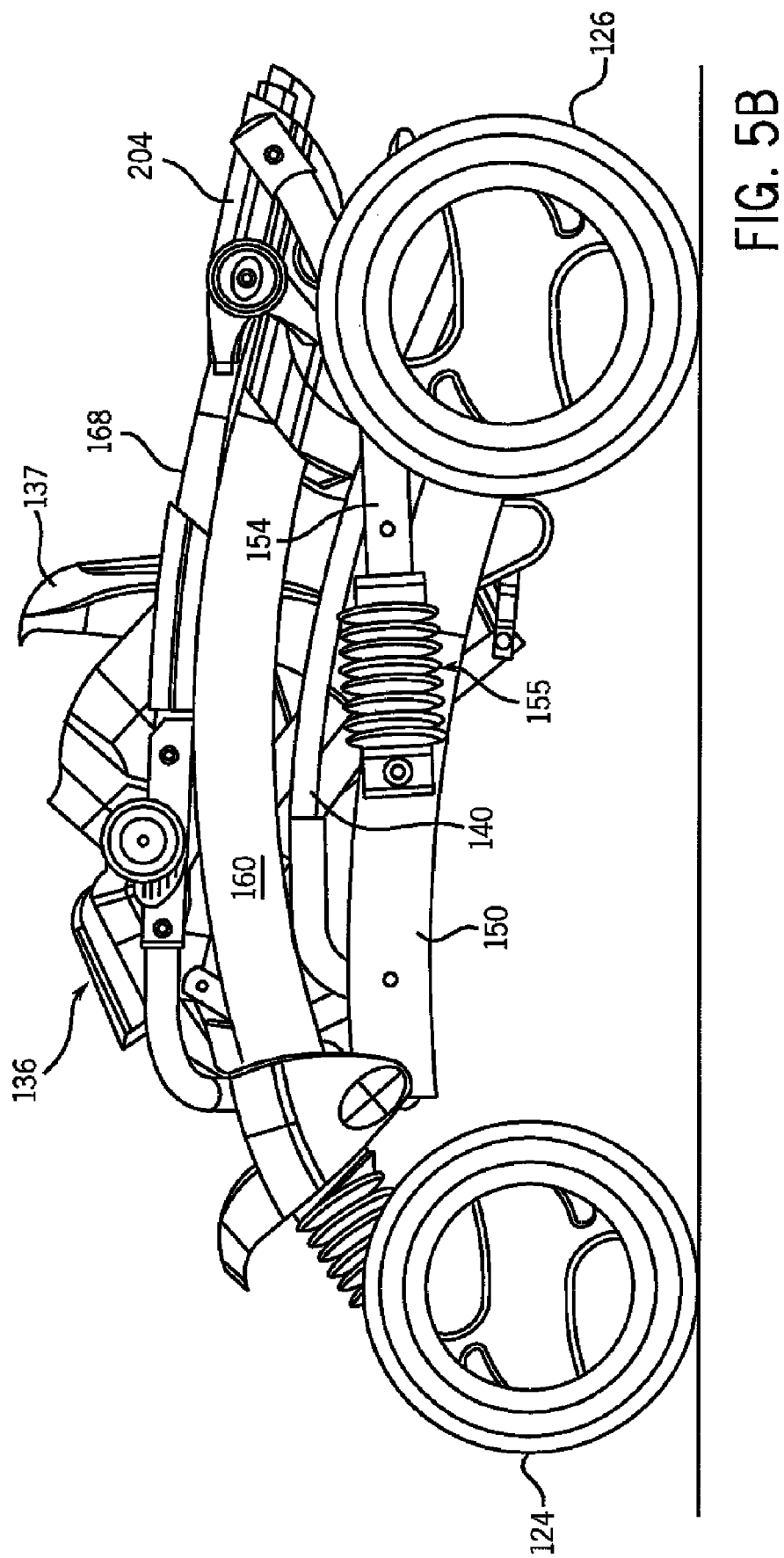
FIG. 5B is a side elevation view of the stroller illustrated in FIG. 5A in the partially folded configuration.

While certain other differences may exist, the fundamental operation of the strollers 20 and 120 are substantially similar. For instance, referring also to FIG. 5B, the latch release handle 176 can be actuated to unlock the latch assembly 156 and allow the stroller 120 to fold. Operation of the latch release handle 76 and latch assembly 56 will now be described with reference to stroller 20, it being understood that the principles of operation apply equally to the latch release handle 176 and latch assembly 56 of stroller 120.

Figure 7:
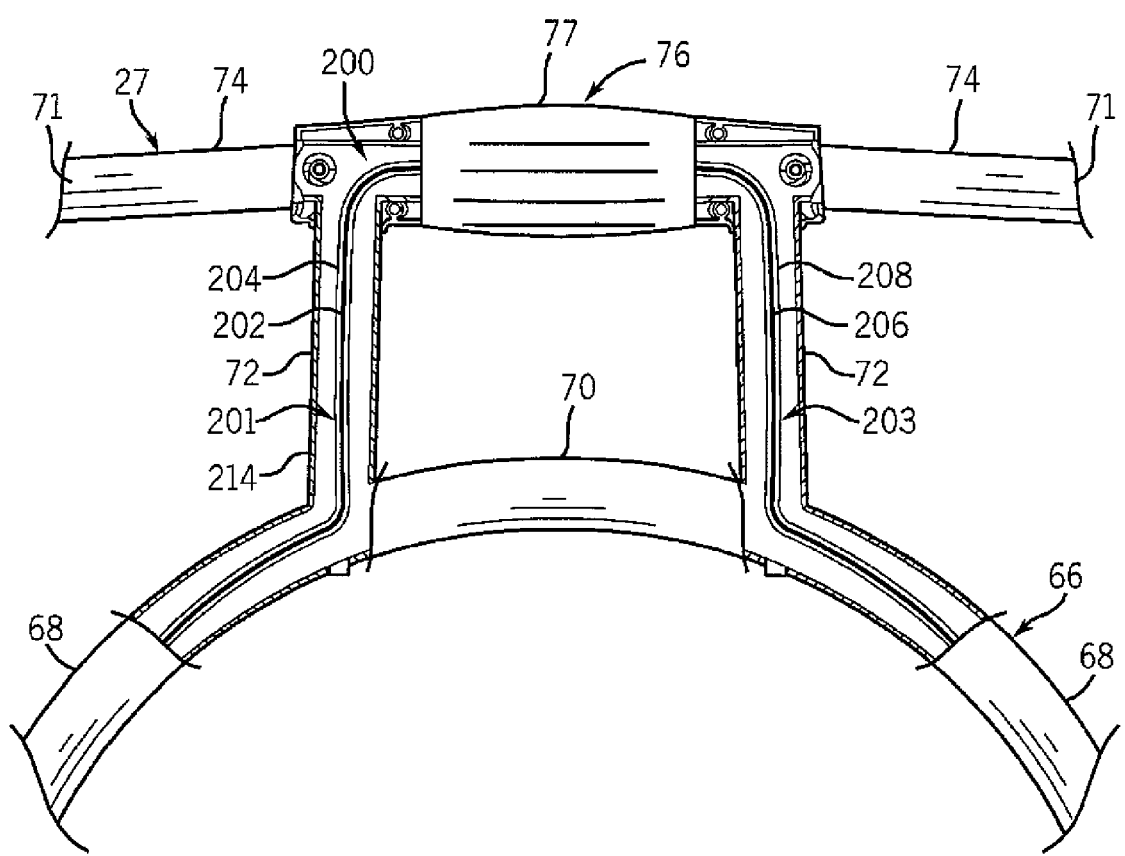
FIG. 7 is a front elevation view of a portion of the stroller frame with portions cut away to illustrate a motion transfer mechanism.

Referring now to FIG. 7, handlebar 27 is illustrated as being connected to the U-shaped section 70 of push arm 66 via a pair of laterally spaced stanchions 72 extending rearward and vertically up from the push arm 66. Specifically, the stanchions 72 are substantially centrally mounted onto the U-shaped section 70. The stanchions 72 are connected to the handlebar 27 such that the latch release handle 76 is disposed between the stanchions 72. Of course, one skilled in the art will appreciate that the scope of the present invention is not intended to be limited to the pair of stanchions 72, and that any number of stanchions can connect the push arm 66 to the handlebar 27. The handlebar 27 extends substantially laterally and has lateral terminal outer ends 71. As described above with reference to FIG. 6B, the handlebar 27 can include auxiliary grips 78 that are connected to outer ends 71. The auxiliary grips 78 extend substantially perpendicular to the grips 74, and can be rotated clockwise and counterclockwise along the direction of Arrow D and locked into the desired position in any known manner. For instance, a pin 79 can be inserted into an aperture disposed in the auxiliary grip 78 and into one of a plurality of radially spaced locating holes (not shown) to locate the angular position of grips 78. Of course, any number of suitable angular adjustment mechanisms known in the art could be employed to facilitate the positional adjustment of the grips 78. The grips 74, 77, and 78 can all comprise a rubber or other elastomeric material, or combination of materials, comfortably engaged by a user.

The stroller frame 22 includes a motion transfer mechanism 200 between the latch release grip 77 and the latch assemblies 56. In the embodiment illustrated in FIG. 7, the motion transfer mechanism is in the form of a first cable assembly 201 including a cable 202 disposed within a corresponding sheath 204, and a second cable assembly 203 including a cable 206 disposed within a corresponding sheath 208. The cable 202 can be formed from any metal wire material, and the sheath can be formed from any elastomeric material that is sufficiently robust to protect the cable 204 within the stroller frame 22. Because the construction and operation of cable assemblies 201 and 203 are similar, and because the construction and operation of the latch assemblies 56 are similar, only the cable assembly 201 is described in detail herein in combination with one of the latch assemblies 56.

Cable assembly 201 is connected at its proximal end to the latch release handle 76, and extends into the stanchion toward the push arm 66. The cable assembly is installed by inserting a tool (not shown) into the open outer end of the handlebar 27. The tool includes an elongated handle and an angled wall at the end of the handle. The tool is inserted such that the wall is placed immediately before the stanchion 72. As the cable assembly 201 is inserted through the handlebar 27, the wall directs the cable assembly down into the stanchion 72. The cable assembly 201 extends down the side arm 68 of the push arm 66, and is connected at its distal end to the latch assembly 56 (see FIG. 16). The present inventors have discovered that the sheath 204 could, but need not be, anchored in the handle 76 and/or at the latch assembly 56. Rather, the sheath 204 extends between the handle and the latch assembly so that it interfaces with a first corner located at the intersection of the handlebar 27 and the stanchion 72, and a second corner located at the intersection of the stanchion 72 and the push bar 66. The interference between the two corners and the sheath 204 provides a sufficient frictional force against the sheath 204 to prevent movement of the sheath during operation. The cable 202 is free to move within the sheath 204 as the handle 76 is actuated. During operation, the user can operate the latch release handle 76, thereby causing translation of the cable 202, which applies an unlocking force onto the latch assembly 56.

Figure 8:
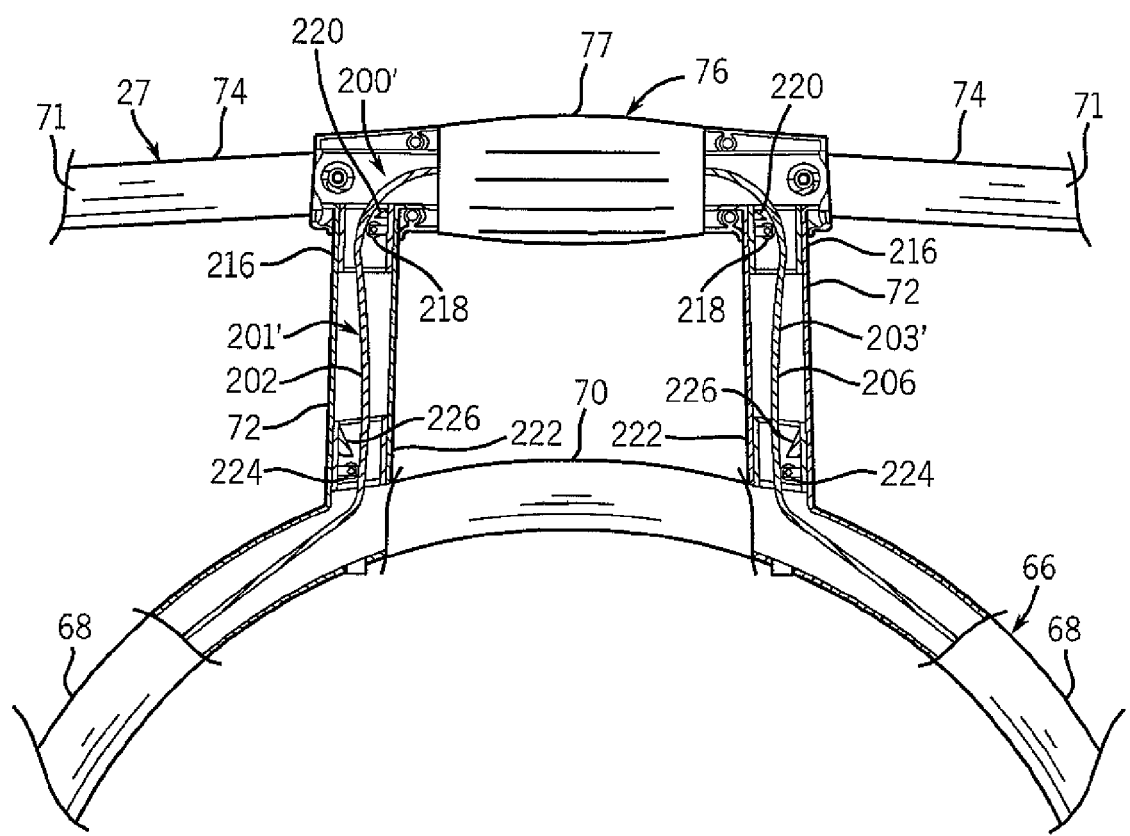
FIG. 8 is a front elevation view of a portion of the stroller frame similar to that illustrated in FIG. 7, but illustrating a motion transfer mechanism constructed in accordance with an alternative embodiment.

It should be appreciated that the motion transfer mechanism 201 illustrated and described with reference to FIG. 7 is only one example of numerous alternative mechanisms, and that all such alternative mechanisms that transfer motion from the latch release handle 76 to the latch assembly 56 are contemplated by the present invention. One such alternative motion transfer mechanism 201' is illustrated in FIG. 8. Specifically, the motion transfer mechanism includes a cable 200' includes cable assemblies 201' and 203' in the form of cables 202 and 204. Because the construction and operation of cable assemblies 201' and 203' are similar, only the cable assembly 201' is described in detail herein. The cable 202 of cable assembly 201' is connected at its proximal end to the latch release handle 76, and extends into the stanchion toward the push arm 66. A cartridge 216 can be installed, for instance inserted axially into the upper end of the stanchion 72 and pressure fit therein, proximal the interface with the handlebar 27. The cartridge 216 includes an internal pulley 218 that is rotatably supported within the cartridge. A wedge 220 is disposed adjacent the pulley 218 and directs the cable 202 over the pulley such that the cable is prevented from rubbing against the corner of the frame 22 at the intersection of the stanchion 72 and the handlebar 27. The cable 202 extends down the stanchion and into a second cartridge 222 that includes an internal pulley 224 that is rotatably supported within the cartridge. Cartridge 222 can be installed into the stanchion, for instance by inserting the cartridge axially into the lower end of the stanchion 72 and pressure fitting the cartridge 222 therein. A wedge 226 is disposed adjacent the pulley 224 and directs the cable 202 over the pulley 224 such that the cable 202 is prevented from rubbing against the corner of the frame 22 at the intersection of the stanchion 72 and the push arm 66. The cable 202 extends down the corresponding side arm 68 of the push arm 66 and can be connected to the latch assembly 56 in the manner illustrated in FIG. 14. During operation, the user can operate the latch release handle 76, thereby causing translation of the cable 202, which applies an unlocking force onto the latch assembly 56.

Figure 9:
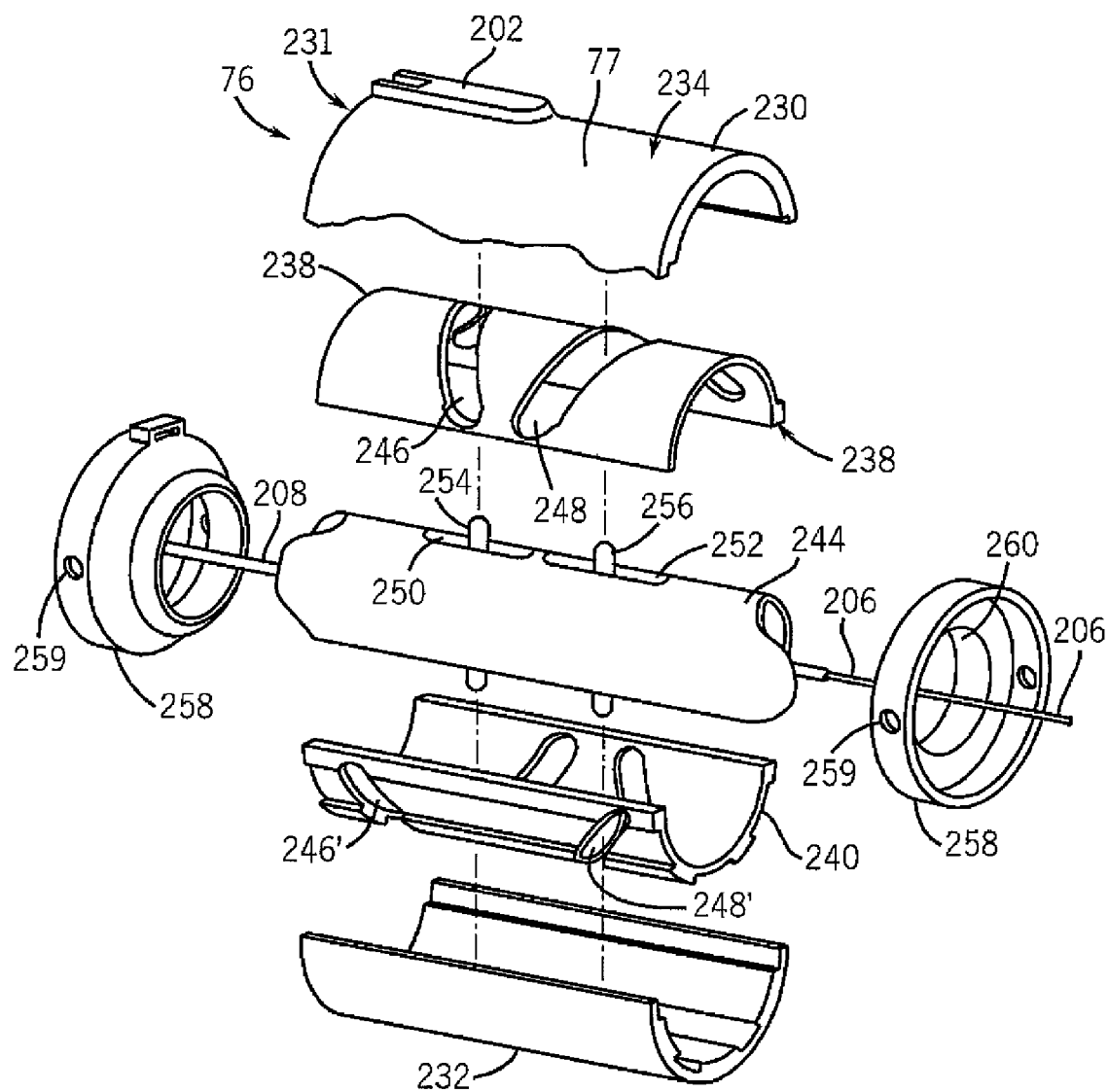
FIG. 9 is an exploded view of the handle assembly illustrated in FIG. 7.
Figure 10:
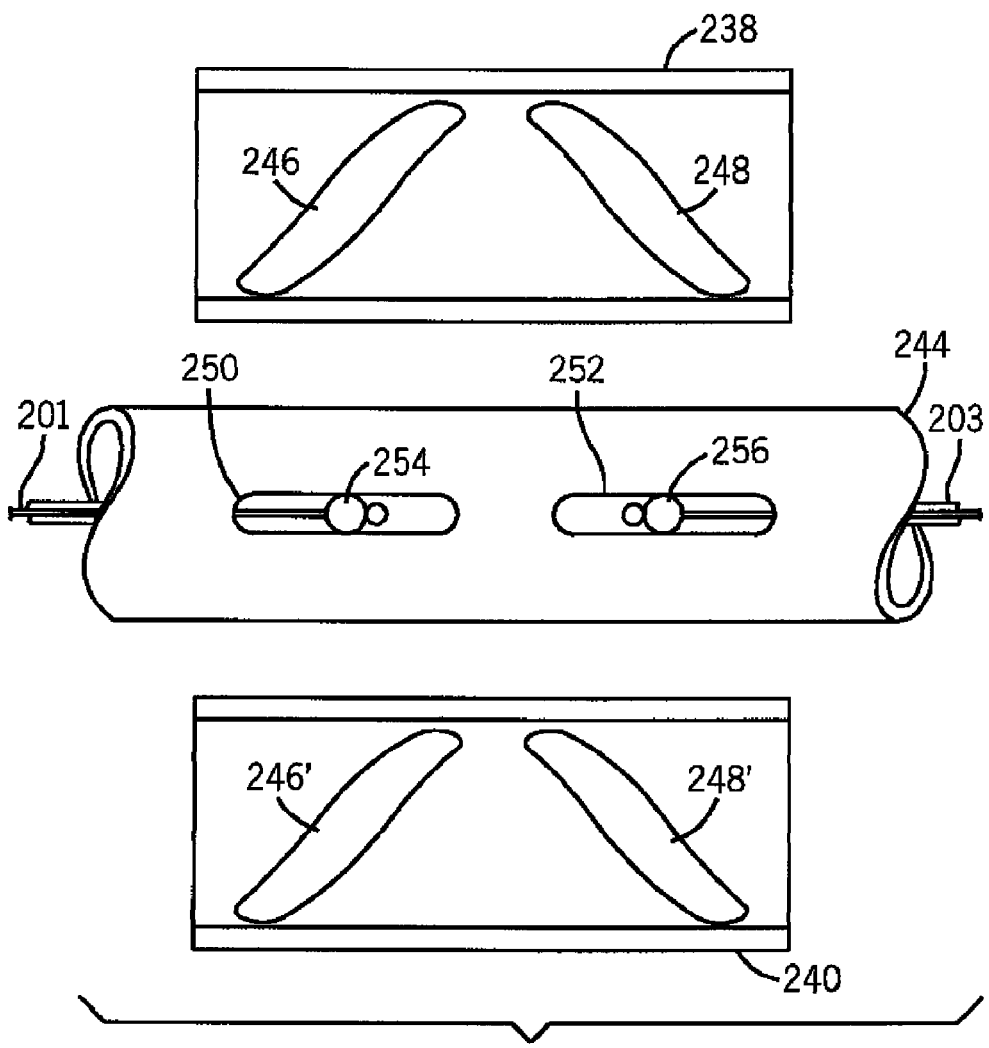
FIG. 10 is an exploded view of a motion conversion assembly that forms a portion of the handle assembly illustrated in FIG. 9.
Figure 11:
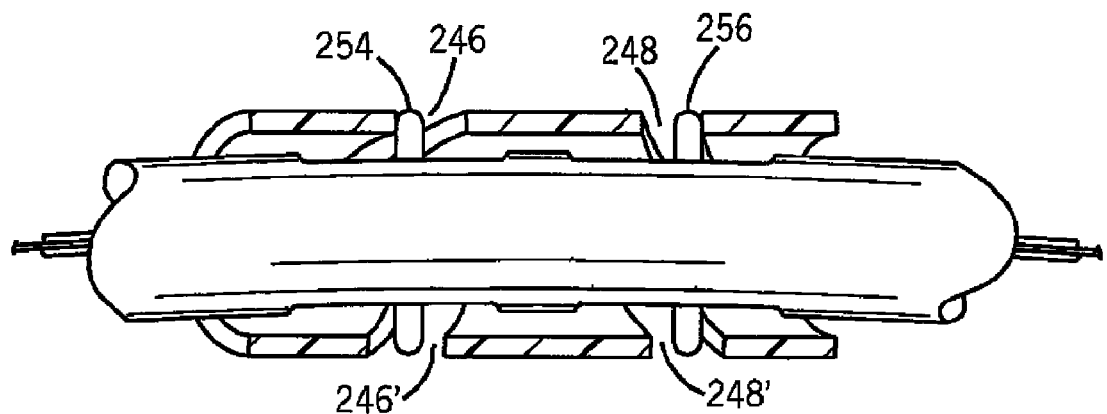
FIG. 11 is a sectional side elevation view of the motion conversion assembly illustrated in FIG. 9.

The latch release handle 76 will now be described with reference to FIGS. 9-11. As illustrated, the latch release handle 76 can have a two-piece construction including generally an outer housing 234 that, as illustrated, includes an outer shell 231 including upper half shell 230 and lower half shell 232. The outer housing 234 provides the gripping surface 77 for the user. The outer housing further includes an inner shell 236 that is disposed radially inward of the outer shell 231. The inner shell 236 includes an upper half shell 238 and a lower half shell 240. In one aspect of the invention, the outer shell 231 can be integrally formed with the inner shell 236. As will be described in more detail below, the inner shell 236 is a motion transfer member that converts radial motion imparted onto the handle 76 by the user into linear motion of the cable assemblies 201 and 203. The outer housing 234 surrounds a central hub 244 and is also concentric to the handlebar 74.

A pair of laterally spaced helical grooves 246 and 248 extends through the upper half shell 238 of the inner shell 236. The grooves 246 and 248 are elongated in a direction that is sloped with respect to the forward-rearward direction, and thus the outer ends of the grooves are laterally offset from each other. Furthermore, the adjacent grooves 246 and 248 are sloped equally and directionally opposite each other. The lower half shell 240 of the inner shell 236 also includes grooves 246' and 248', which are operatively aligned with grooves 246 and 248.

A pair of laterally elongated and laterally spaced slots 250 and 252 extends through the hub 244. Each slot 250 and 252 receives corresponding pins 254 and 256 that extend vertically through the hub 244. The pins 254 and 256 are thus configured for lateral movement within their corresponding slots 250 and 252. Each pin 254 and 256 are connected to the cables 202 and 206, respectively (not shown). The pins 254 and 256 thus extend through the corresponding slots 250 and 252, and further extend through the corresponding grooves 246 and 246', and 248 and 248', respectively.

A pair of end caps 258 is provided that can be pressure fit in the laterally outer ends of the hub 244 and can interlock or otherwise attach to the hub 244 to prevent circumferential and axial slippage between the end cap 258 and the hub 244. In one aspect of the present invention, the end caps 258 can be mounted to handlebar 27 via a screw or other attachment mechanism that extends through apertures 259 so that the end caps remain stationary during operation, and thus ensure that the outer housing 234 rotates with respect to the stationary hub 244. Each cable 202 and 206 extends through the end caps 258 and is connected to the respective pins 254 and 256.

The grooves 246 and 246' cooperate with pin 254, and grooves 248 and 248' cooperate with pin 256. Specifically, grooves 246 and 246' are constructed such that the pin 254 moves laterally along the length of the slot 250 as the grooves 246 and 246' rotate. As the handle 76 is rotated by an operator, the rotation of the handle causes the grooves 246 and 322 to slide pin 254 axially along the length of the slot 250. Accordingly, the handle 76 converts rotational motion into linear motion and imparts the linear motion onto the cables 202 and 206. When the pin 254 moves along the axial length of tube 244, pin 254 pulls the cable 202 along with it. The motion and force of the wire is then used to release the corresponding latch assembly 56, as is described in more detail below. In a similar manner, grooves 248 and 248' cooperate with pin 256 to slide the pin 256 along slot 252 when the moving member is rotated, thus causing the cable 206 to release the corresponding latch assembly 56.

Figure 12:
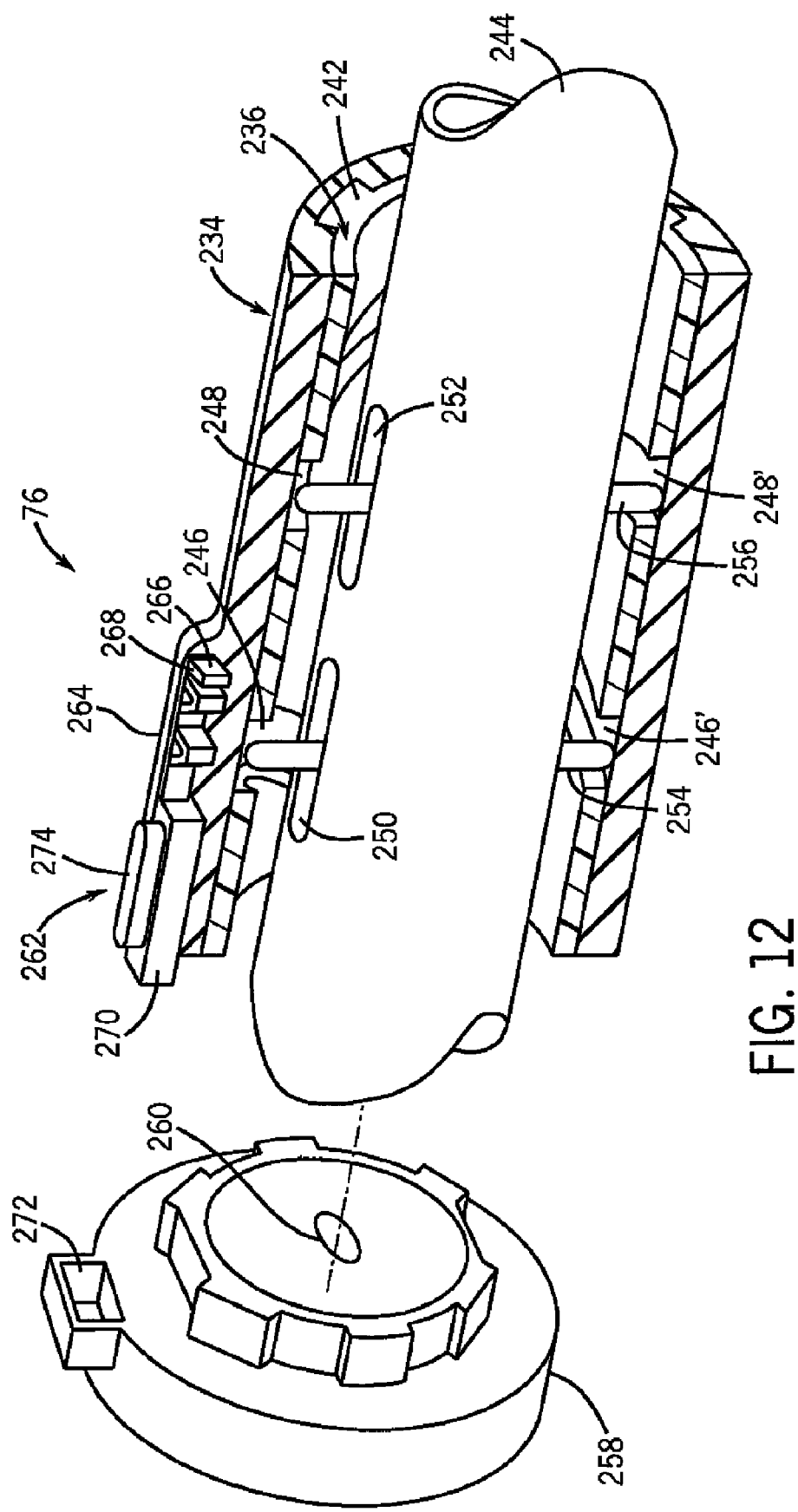
FIG. 12 is a sectional side elevation view of a portion of the handle assembly illustrating a locking mechanism.
Figure 13:
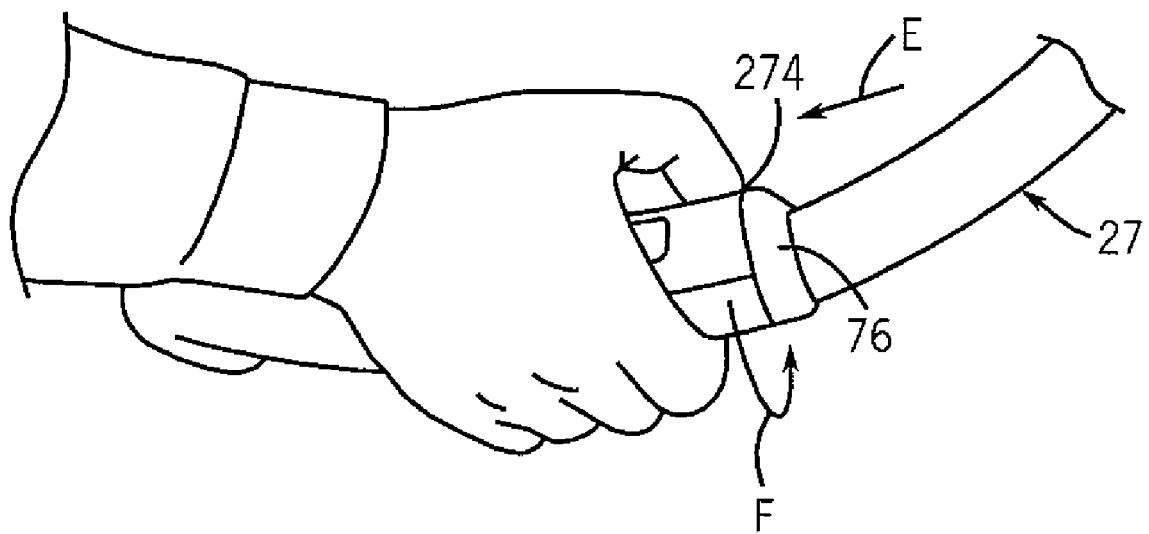
FIG. 13 is a perspective view schematically illustrating the operation of the handle assembly.

Referring now to FIGS. 12-13, one of the end caps 258 includes a rotation lock 262 that is operable to prevent rotation of the handle 76 when engaged. Specifically, a substantially rectangular housing 264 extends out from the housing proximate to one of the lateral ends of the housing, and retains an inwardly projecting seat 266. A spring 268 extends between the seat 266 and a laterally extending latch 270 also disposed in the housing 264. The end cap 258 includes a pocket 272 that is in radial alignment with the latch 270. The pocket 272 is in angular alignment with the latch 270 when the handle 76 is disposed in the neutral position such that the latch assembly 56 is in the locked position. The latch 270 extends laterally out from the housing 264 and is configured to extend into the pocket 272. Accordingly, the latch 270 interlocks the outer housing 234 with the end cap 258 and prevents the housing 234 from rotating. An actuator 274 is coupled to the latch 270 and projects out of the housing 234, and is thus accessible to the user.

During operation, the spring 268 biases the latch 270 into the pocket 272. As illustrated in FIG. 13, when the user wishes to fold the stroller 20, the user translates the actuator 274 away from the end cap 258 along the direction of Arrow E, thereby removing the latch from interference with the pocket and allowing the handle 76 to rotate along the direction of Arrow F. Once the user releases the actuator 274, the spring 268 again biases the latch 270 towards the end cap 258. If the handle 76 is in the neutral position, the latch 270 will extend into the pocket 272 and lock the handle 76 with respect to rotation. The construction and operation of the handle 76 is further described in U.S. Pat. No. 6,068,284, the disclosure of which is hereby incorporated by reference as if set forth in its entirety herein.

The construction and operation of the latch assembly 56 will now be described with reference to FIGS. 14-17. Specifically, each latch assembly 56 includes an outer housing 300 that partially receives an inner housing 302. The outer and inner housings 300 and 302, respectively, can be molded of a plastic material, such as nylon 6.

The outer housing 300 includes a lower longitudinally elongated cavity 308 and a pair of laterally spaced vertical flanges 310 extending up from the cavity 308. A first tube 304, which can be attached to the side arm 68 of push arm 66, or could be integrally connected to the side arm 68, is received inside the cavity 308 of the outer housing 300. The inner housing 302 includes a body 307 sized to fit between the vertical flanges 310. The housing body 307 defines a longitudinally elongated socket 312 that generally closely conforms to the profile of the upper end of side arm 60. The socket 312 receives a second tube 306, which can be attached to the side arm 60 of support arm 58, or could be integrally connected to the side arm 60. One end of the inner housing 302 that interfaces with the outer housing 300 includes a pivot portion 314 having a centrally disposed rivet hole 316 extending therethrough and aligned with a pair of aligned rivet holes 320 (one shown) extending laterally through the upper ends of the flanges 310 of outer housing 300. The rivet holes 316 and 320 define a pivot axis 318. When the latch assembly 56 is unlocked, the inner and outer housings 300 and 302 are pivotable with respect to each other about the pivot axis 318.

Figure 17:
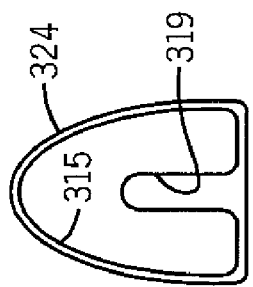
FIG. 17 is a partial sectional side elevation view of the latch assembly illustrated in FIG. 16 taken along line 17-17.

The upper end of the side arm 60 necks down so that it fits within the latch assembly 56. FIG. 17 illustrates the necked-down or "crushed" cross-section 315 of the upper end of the side arm 60, or tube 306, in which a longitudinal crease 319 effectively folds the lower portion of the tube up into itself. Thus socket 312 narrows from an entry 322 with an oval cross-section that matches the full oval cross-section of the front leg, to a domed and flat-bottomed cross-section 324. The rivet hole 316 receives the rivet 326 that joins the outer housing 300 and inner housing 302 together through holes 320, 316 and anchors the front leg in the socket 312.

The inner housing 302 further includes a receiver 327 disposed below socket 312. The receiver 327 has a mouth 330 that defines inwardly extending opening having an outer lip 332. The mouth 330 is aligned with the lower longitudinally elongated cavity 308 of outer housing 300. A retractable plunger 334 defines one end that is housed in the cavity 308 of outer housing 300. The other end of the plunger 334 is received by the lip 332 and mouth 330 of inner housing 302. The plunger 334 can be molded of acetal resin, i.e., polyoxymethylene, or "POM." The plunger 334 is substantially shrouded by latch housings 300 and 302 so as to be protected from dust and dirt. Alternatively, the plunger 334 could be sized and shaped to nest within tube 304 within the latch assembly 56.

The plunger 334 slides within the cavity 308, guided by the end of the tube 304 that it surrounds. The tube 304 is anchored to outer housing 300 by a rivet 336 through hole 341 formed in tube 304 and further through a hole 339 extending through outer housing 300. The rivet 336 further passes through a pair of elongated slots 338 in the sides of plunger 334. The engagement between the rivet 336 and slots 338 guides and limits the movement of the plunger 334 within the latch assembly 56. A helical spring 340, captured between the plunger 334 and a shoulder 342 (or alternatively a rivet) disposed within cavity 308, biases the plunger 334 outward, toward the receiver 327.

The housing 302-facing end 344 of the plunger 334 has a sloped face with a hole 346 and a notched cable-and-ball anchoring recess 348. The cable 202 extends through the handle from latch release handle 76 as described. The cable 202 extends through the interior of plunger 334 and through hole 346, and has a ball end 350 anchored in recess 348.

Figure 16:
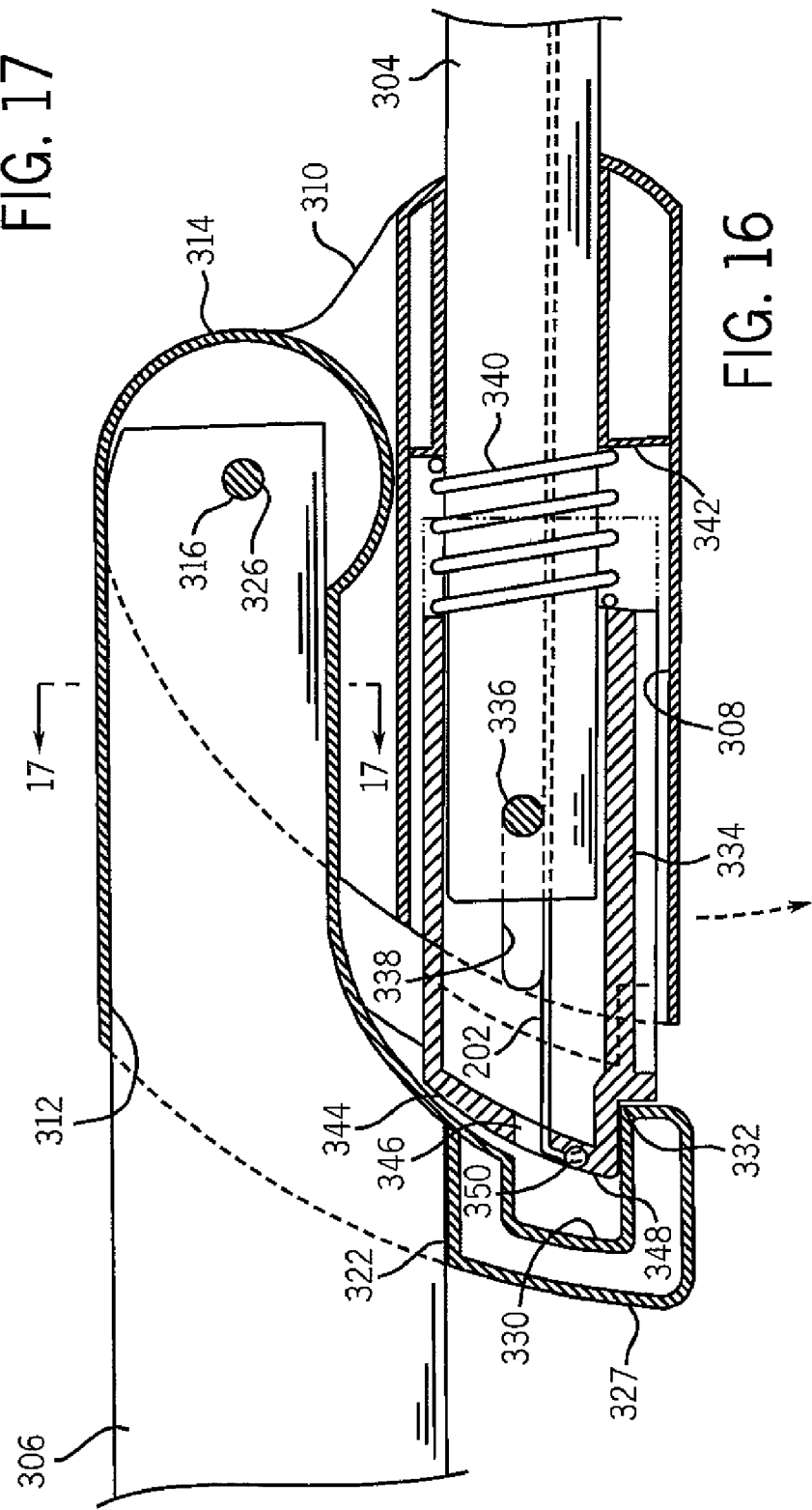
FIG. 16 is a sectional side elevation view of the latch assembly illustrated in FIG. 14 taken along line 16-16.

Referring now to FIG. 16 in particular, the latch assembly 56 is in a locked position, whereby a portion of the plunger 334 is retained in the mouth 330 of receiver 327. When the grip 76 is rotated, cable 202 retracts plunger 334 against the spring force until its distal end clears lip 332 (i.e., to the dashed line position shown in FIG. 16). The user can then pivot the handlebar 27 as illustrated in FIG. 13 to fold the stroller 20.

Figure 14:
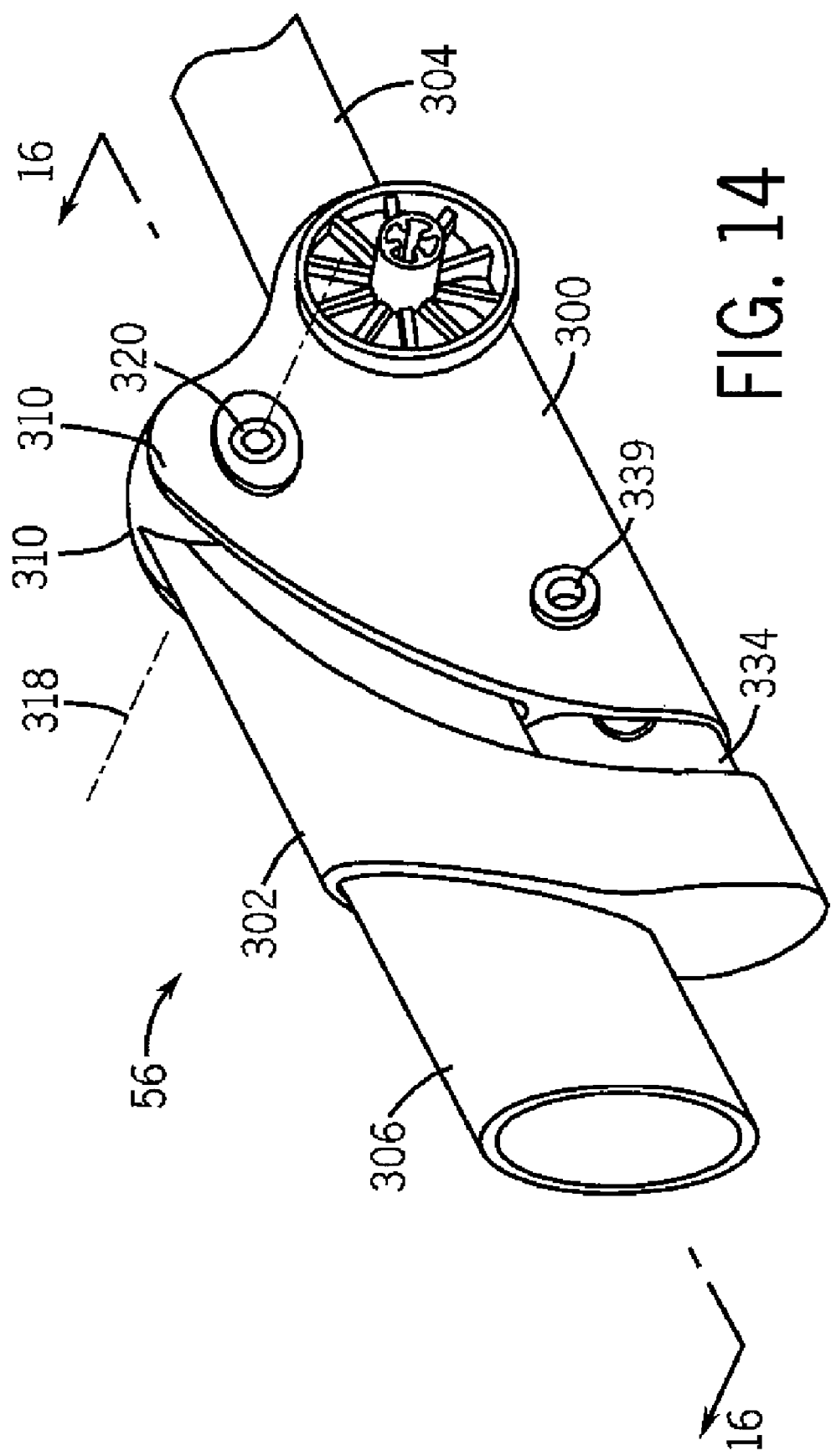
FIG. 14 is a side elevation view of a portion of the stroller frame illustrating a latch assembly.
Figure 15:
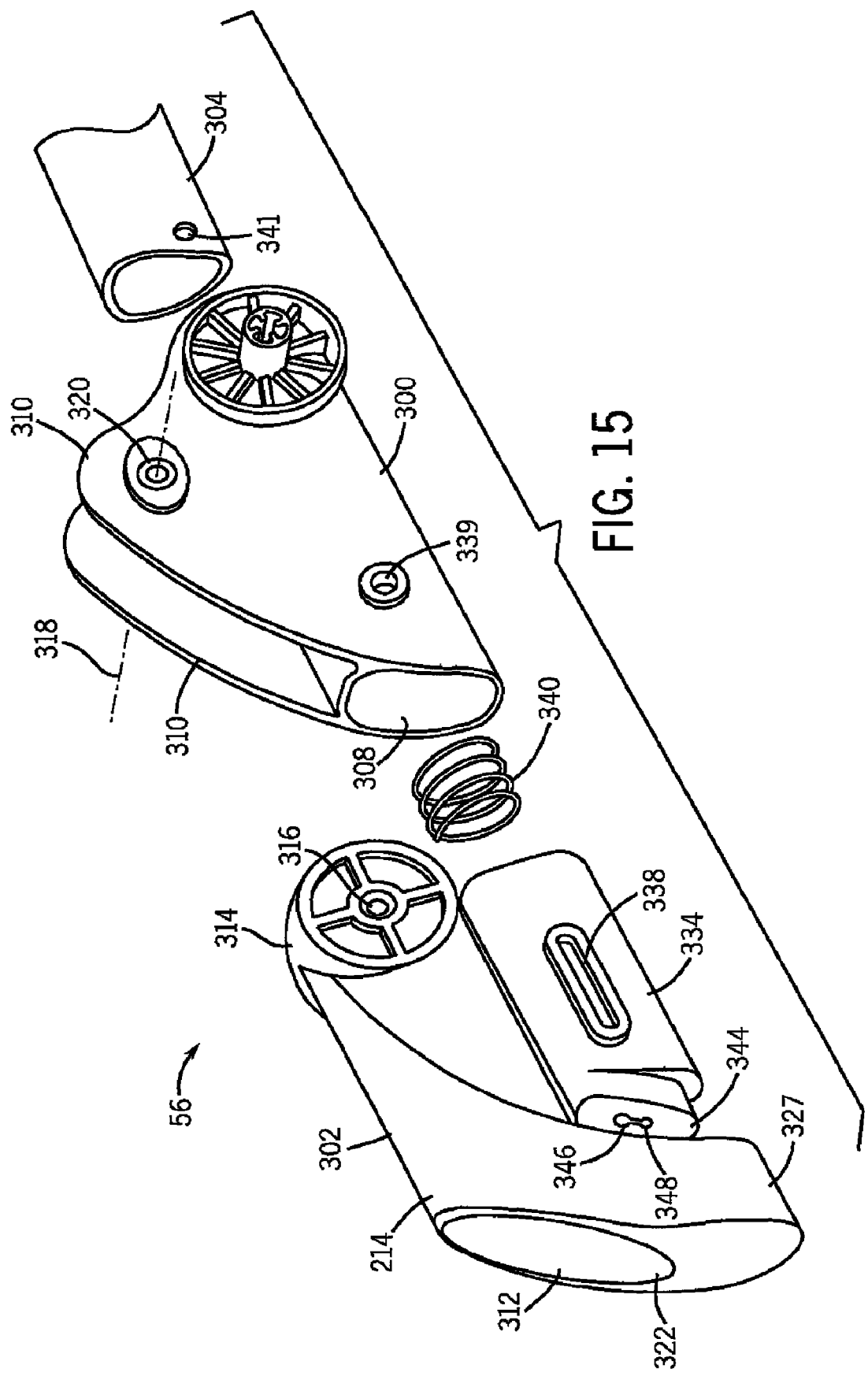
FIG. 15 is an exploded assembly view of the latch assembly illustrated in FIG. 14.

When the stroller 20 is to be opened from the folded position, tube 304 is rotated relative to tube 306 toward the position illustrated in FIG. 14 When the end 344 of plunger 334 meets lip 332, the sloped face of the plunger 334 provides a cam surface that pushes the plunger further into the cavity 308 against the force of spring 340. When the tip of the plunger 334 clears the lip 332, the spring forces the plunger 334 into the mouth 330 to lock the frame in the open position. The construction and operation of latch assembly 56 is further described in U.S. Pat. No. 7,188,858, the disclosure of which is hereby incorporated by reference as if set forth in its entirety herein.

During operation, the stroller 20 is thus folded by first translating the actuator 274 to the unlocked position and rotating the latch release handle 76, thereby causing the cable 202 to retract the plunger 334 until its distal end clears lip 332. The tube 304 and side arm 68 are then able to pivot, which facilitates collapsing of the stroller 20. When the stroller 20 is unfolded, the tip of the plunger 334 clears the lip 332 and the spring forces the plunger 334 into the mouth 330 to lock the frame in the open position. The handle 76 is returned to its neutral position under the assistance of the force of spring 326.

The above has been described as a preferred embodiment of the present invention. It will occur to those that practice the art that many modifications may be made without departing from the spirit and scope of the invention. In order to apprise the public of the various embodiments that may fall within the scope of the invention, the following claims are made.

What is claimed is:

1. A stroller, foldable between an open position and a folded position, comprising:
   a frame supported by front and rear wheels, the frame including a latch assembly movable between a locked position and an unlocked position, wherein when in the locked position the latch assembly prevents the frame from being folded, and when in the unlocked position, the latch assembly allows the frame to be folded;
   a push arm coupled to the frame in proximity to the latch assembly;
   a stanchion coupled to and extending rearward and upward relative to the push arm;
   a discrete handlebar coupled to and extending rearward and upward from the the stanchion, the handlebar extending laterally and having outer terminal ends not directly connected to the push arm, wherein the discrete handlebar includes a latch release handle;
   a motion transfer mechanism operably coupling the latch release handle and the latch assembly,
   wherein movement of the latch release handle causes the motion transfer mechanism to move the latch assembly to the unlocked position.

2. The stroller as recited in claim 1, wherein the discrete handlebar further includes a pair of auxiliary grips extending out from the outer terminal ends.

3. The stroller as recited in claim 2, wherein the auxiliary grips extend substantially perpendicular with respect to the outer terminal ends.

4. The stroller as recited in claim 3, wherein the auxiliary grips are rotatable about the outer terminal ends.

5. The stroller as recited in claim 4, wherein the motion transfer mechanism comprises a cable assembly connected between the latch release handle and latch assembly.

6. The stroller as recited in claim 5, wherein the cable assembly extends through the stanchion, the push arm, and the stroller frame.

7. The stroller as recited in claim 5, wherein the cable assembly comprises a cable surrounded by an outer sheath.

8. The stroller as recited in claim 7, wherein the stroller frame comprises at least one directional member directing the cable assembly inside the frame.

9. The stroller as recited in claim 7, wherein the directional member comprises a curved channel disposed in the stanchion.

10. The stroller as recited in claim 7, wherein the directional member comprises a deflection pin disposed in the discrete handlebar.

11. The stroller as recited in claim 5, wherein the cable assembly comprises a cable extending through the frame operably coupled to at least one pulley disposed in the frame.

12. The stroller of claim 4, wherein each auxiliary grip includes an aperture disposed thereon and a pin configured to be inserted into the aperture to lock the respective auxiliary grip and prevent further rotation of the auxiliary grips about the outer terminal ends.

13. The stroller as recited in claim 1, wherein the latch release handle is rotatable and further comprises a motion transfer member that converts the radial motion of the handle to linear motion imparted onto the motion transfer mechanism.

14. A stroller, foldable between an open position and a folded position, comprising:
   a frame including
      elongated bottom member having a front portion in proximity to a front wheel and a rear portion in proximity to a rear wheel;
      front legs each pivotally connected to the front portion of the bottom member;
      a push arm having a lower end in proximity to the upper ends of the front legs;
      support struts pivotally connected to the bottom members; and
      a latch assembly receiving one of the front legs, part of the push arm, and one of the support struts, the latch assembly movable between a locked position and an unlocked position, wherein when in the locked position the latch assembly prevents the frame from being folded, and when in the unlocked position, the latch assembly allows the frame to be folded;
   a stanchion coupled to and extending rearward and upward relative the push arm;
   a discrete handlebar coupled to and extending rearward and upward from the stanchion, the handlebar having outer terminal free ends, wherein the handlebar includes a latch release handle; and
   a motion transfer mechanism operably connected between the latch release handle and the latch assembly,
   wherein movement of the latch release handle causes the motion transfer mechanism to move the latch assembly to the unlocked position.

15. The stroller as recited in claim 14, wherein the motion transfer mechanism extends through an interior of the discrete handlebar, stanchion, and push arm.

16. The stroller as recited in claim 14, wherein radial movement of the latch release handle causes the cable to translate which, in turn, unlocks the latch assembly.

17. A stroller, foldable between an open position and a folded position, comprising:
   a frame including
      a first and second spaced bottom member connected between a front wheel and a rear wheel;
      a first and second latch assembly;
      a first and second front leg pivotally connected to the first and second bottom member, respectively, at one end, and connected to the first and second latch assemblies, respectively, at an opposing end;
      a push arm having a curved end and first and second side arms connected to the first and second latch assembly, respectively at their front ends, and to the curved end at their rear ends; and
      a first and second support strut pivotally connected to the first and second bottom members, respectively, at one end, and connected to the first and second latch assembly, respectively, at an opposing end;
   first and second stanchions attached to and extending upward and rearward from the curved end of the push arm between the first and second side arms;
   a handlebar attached to and extending upward and rearward from the first and second stanchions, the handlebar having outer terminal ends, wherein the handlebar includes a latch release handle;
   a motion transfer mechanism operably connected between the latch release handle and the first and second latch, wherein the motion transfer mechanism extends through the first and second stanchions, the curved end, and the first and second side arms,
   wherein movement of the latch release handle causes the motion transfer mechanism to move the latch assemblies from a locked position whereby the latch assemblies prevent the frame from being folded, to an unlocked position whereby the latch assembly allows the frame to be folded.

18. The stroller of claim 17, wherein the motion transfer mechanism comprises first and second cables routed by first and second pulleys within the first and second stanchions, the curved end, and the first and second side arms.

* * * * *